(12) United States Patent
Hsueh et al.

(10) Patent No.: US 10,656,386 B2
(45) Date of Patent: May 19, 2020

(54) PHOTOGRAPHING OPTICAL LENS SYSTEM, IMAGE CAPTURING APPARATUS AND ELECTRONIC DEVICE

(71) Applicant: LARGAN PRECISION CO., LTD., Taichung (TW)

(72) Inventors: Chun-Che Hsueh, Taichung (TW); Yu-Tai Tseng, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 98 days.

(21) Appl. No.: 16/104,211

(22) Filed: Aug. 17, 2018

(65) Prior Publication Data

US 2018/0373000 A1    Dec. 27, 2018

Related U.S. Application Data

(63) Continuation of application No. 15/484,532, filed on Apr. 11, 2017, now Pat. No. 10,082,646.

(30) Foreign Application Priority Data

Nov. 22, 2016   (TW) .............................. 105138291 A

(51) Int. Cl.
  *G02B 9/62*    (2006.01)
  *G02B 13/00*   (2006.01)
  (Continued)

(52) U.S. Cl.
  CPC ........... *G02B 13/0045* (2013.01); *G02B 9/62* (2013.01); *G02B 27/0025* (2013.01); *G02B 7/08* (2013.01);
  (Continued)

(58) Field of Classification Search
  CPC ... G02B 13/0045; G02B 9/62; G02B 27/0025
  See application file for complete search history.

(56) References Cited

U.S. PATENT DOCUMENTS 8,477,431 B2 * 7/2013 Huang ............... G02B 13/0045
                                                         359/713
8,743,477 B2   6/2014 Tsai et al.
  (Continued)

FOREIGN PATENT DOCUMENTS

| JP | 2014044250 A  | 3/2014 |
| WO | 014013676 A1  | 1/2014 |
| WO | 2015060166 A1 | 4/2015 |

*Primary Examiner* — Joseph P Martinez
(74) *Attorney, Agent, or Firm* — McClure, Qualey & Rodack, LLP

(57) ABSTRACT

A photographing optical lens system includes six lens elements, which are, in order from an object side to an image side, a first lens element, a second lens element, a third lens element, a fourth lens element, a fifth lens element and a sixth lens element. The first lens element has positive refractive power. The second lens element with positive refractive power has an image-side surface being convex in a paraxial region thereof. The third lens element has an image-side surface being concave in a paraxial region thereof. The fourth lens element with negative refractive power has an object-side surface being concave in a paraxial region thereof. The fifth lens element with positive refractive power has an image-side surface being convex in a paraxial region thereof. The sixth lens element with negative refractive power has an image-side surface being concave in a paraxial region thereof.

24 Claims, 23 Drawing Sheets

(51) Int. Cl.
*G02B 27/00* (2006.01)
*G02B 7/08* (2006.01)
*G02B 27/64* (2006.01)
*G02B 27/01* (2006.01)

(52) U.S. Cl.
CPC .... *G02B 27/646* (2013.01); *G02B 2027/0138* (2013.01)

(56) References Cited

U.S. PATENT DOCUMENTS

| | | |
|---|---|---|
| 9,046,672 B2 | 6/2015 | You |
| 9,274,315 B2 | 3/2016 | Lee |
| 9,285,568 B2 | 3/2016 | Yamazaki et al. |
| 2014/0376107 A1 | 12/2014 | Son |
| 2015/0022905 A1 | 1/2015 | Shinohara et al. |
| 2015/0109684 A1 | 4/2015 | Son |
| 2015/0124332 A1 | 5/2015 | Noda et al. |
| 2015/0241662 A1 | 8/2015 | Hashimoto |
| 2016/0147044 A1 | 5/2016 | Kondo |
| 2016/0161716 A1 | 6/2016 | Chae |
| 2016/0282588 A1 | 9/2016 | Sekine et al. |
| 2017/0123187 A1 | 5/2017 | Heu et al. |
| 2018/0039046 A1 | 2/2018 | Lee et al. |

* cited by examiner

PHOTOGRAPHING OPTICAL LENS SYSTEM, IMAGE CAPTURING APPARATUS AND ELECTRONIC DEVICE

RELATED APPLICATIONS

The present application is a continuation of the application Ser. No. 15/484,532, filed Apr. 11, 2017 which claims priority to Taiwan Application Serial Number 105138291, filed Nov. 22, 2016, which is herein incorporated by reference.

BACKGROUND

Technical Field

The present disclosure relates to a photographing optical lens system and an image capturing apparatus. More particularly, the present disclosure relates to a photographing optical lens system and an image capturing apparatus with a compact size applicable to electronic devices.

Description of Related Art

With the popularization of smart electronic devices and recent technology advances, satisfactory standards for photographing functionality of these devices from most users are becoming higher than ever, such as demands for image features with wide field of view and depth of field, etc. Thus, building devices equipped with lens assemblies having a wide field of view, large aperture and high resolution is becoming a trend. However, smart electronic devices need a compact design, and dimensions of corresponding photographing modules are also restricted. Hence, corresponding lens assemblies should satisfy lens compactness with a large aperture and a large field of view at the same time.

SUMMARY

According to one aspect of the present disclosure, a photographing optical lens system includes six lens elements, the six lens elements being, in order from an object side to an image side, a first lens element, a second lens element, a third lens element, a fourth lens element, a fifth lens element and a sixth lens element. The first lens element has positive refractive power. The second lens element with positive refractive power has an image-side surface being convex in a paraxial region thereof. The third lens element has an image-side surface being concave in a paraxial region thereof. The fourth lens element with negative refractive power has an object-side surface being concave in a paraxial region thereof. The fifth lens element with positive refractive power has an image-side surface being convex in a paraxial region thereof. The sixth lens element with negative refractive power has an image-side surface being concave in a paraxial region thereof, wherein an object-side surface and the image-side surface of the sixth lens element are aspheric, and the image-side surface of the sixth lens element includes at least one convex critical point in an off-axial region thereof. When a focal length of the third lens element is f3, a focal length of the fourth lens element is f4, an axial distance between the third lens element and the fourth lens element is T34, and an axial distance between the fifth lens element and the sixth lens element is T56, the following conditions are satisfied:
$-1.0 < f4/|f3|$; and
$T56/T34 < 1.0$.

According to another aspect of the present disclosure, an image capturing apparatus includes the photographing optical lens system of the aforementioned aspect and an image sensor, wherein the image sensor is disposed on an image surface of the photographing optical lens system.

According to another aspect of the present disclosure, an electronic device includes the image capturing apparatus of the aforementioned aspect.

According to another aspect of the present disclosure, a photographing optical lens system includes six lens elements, the six lens elements being, in order from an object side to an image side, a first lens element, a second lens element, a third lens element, a fourth lens element, a fifth lens element and a sixth lens element. The first lens element has an object-side surface being convex in a paraxial region thereof. The second lens element with positive refractive power has an image-side surface being convex in a paraxial region thereof. The third lens element has an image-side surface being concave in a paraxial region thereof. The fourth lens element with negative refractive power has an object-side surface being concave in a paraxial region thereof. The fifth lens element with positive refractive power has an image-side surface being convex in a paraxial region thereof. The sixth lens element with negative refractive power has an image-side surface being concave in a paraxial region thereof, wherein an object-side surface and the image-side surface of the sixth lens element are aspheric, and the image-side surface of the sixth lens element includes at least one convex critical point in an off-axial region thereof. When a focal length of the third lens element is f3, a focal length of the fourth lens element is f4, a curvature radius of an object-side surface of the second lens element is R3, a curvature radius of the image-side surface of the second lens element is R4, an axial distance between the third lens element and the fourth lens element is T34, and an axial distance between the fifth lens element and the sixth lens element is T56, the following conditions are satisfied:
$-1.0 < f4/|f3|$;
$-0.70 < (R3+R4)/(R3-R4)$; and
$T56/T34 < 1.0$.

According to another aspect of the present disclosure, a photographing optical lens system includes six lens elements, the six lens elements being, in order from an object side to an image side, a first lens element, a second lens element, a third lens element, a fourth lens element, a fifth lens element and a sixth lens element. The first lens element has positive refractive power. The second lens element with positive refractive power has an image-side surface being convex in a paraxial region thereof. The third lens element has an object-side surface being convex in a paraxial region thereof and an image-side surface being concave in a paraxial region thereof. The fourth lens element with negative refractive power has an object-side surface being concave in a paraxial region thereof. The fifth lens element with positive refractive power has an image-side surface being convex in a paraxial region thereof. The sixth lens element with negative refractive power has an image-side surface being concave in a paraxial region thereof, wherein an object-side surface and the image-side surface of the sixth lens element are aspheric, and the image-side surface of the sixth lens element includes at least one convex critical point in an off-axial region thereof. When a focal length of the third lens element is f3, a focal length of the fourth lens element is f4, an axial distance between the third lens element and the fourth lens element is T34, and an axial distance between the fifth lens element and the sixth lens element is T56, the following conditions are satisfied:

−4.0<f4/|f3|; and
T56/T34<1.0.

According to another aspect of the present disclosure, a photographing optical lens system includes six lens elements, the six lens elements being, in order from an object side to an image side, a first lens element, a second lens element, a third lens element, a fourth lens element, a fifth lens element and a sixth lens element. The first lens element has an object-side surface being convex in a paraxial region thereof. The second lens element with positive refractive power has an image-side surface being convex in a paraxial region thereof. The third lens element has an object-side surface being convex in a paraxial region thereof and an image-side surface being concave in a paraxial region thereof. The fourth lens element with negative refractive power has an object-side surface being concave in a paraxial region thereof. The fifth lens element with positive refractive power has an image-side surface being convex in a paraxial region thereof. The sixth lens element with negative refractive power has an image-side surface being concave in a paraxial region thereof, wherein an object-side surface and the image-side surface of the sixth lens element are aspheric, and the image-side surface of the sixth lens element includes at least one convex critical point in an off-axial region thereof. When a focal length of the third lens element is f3, a focal length of the fourth lens element is f4, a curvature radius of an object-side surface of the second lens element is R3, a curvature radius of the image-side surface of the second lens element is R4, an axial distance between the third lens element and the fourth lens element is T34, and an axial distance between the fifth lens element and the sixth lens element is T56, the following conditions are satisfied:
−1.5<f4/|f3|;
−0.70<(R3+R4)/(R3−R4); and
T56/T34<1.0.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
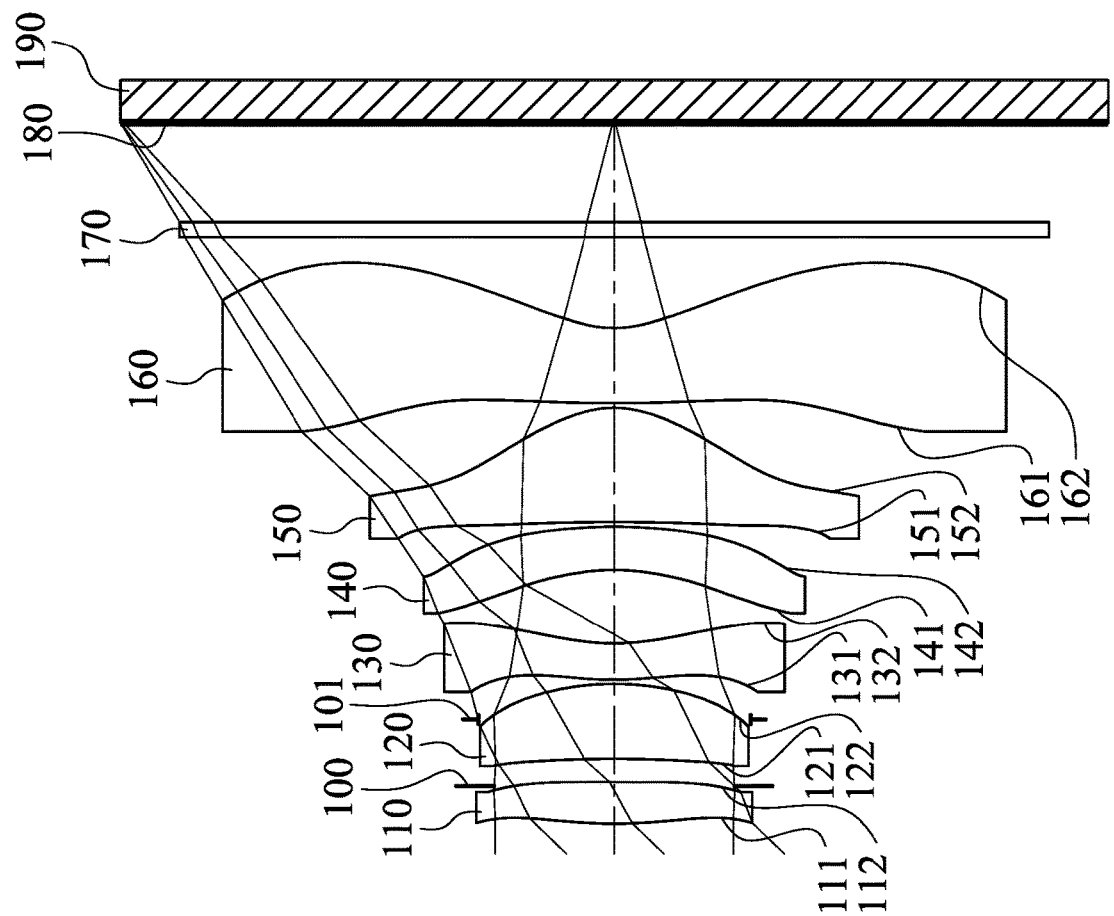
FIG. 1 is a schematic view of an image capturing apparatus according to the 1st embodiment of the present disclosure.

A photographing optical lens system includes six lens elements, which are, in order from an object side to an image side, a first lens element, a second lens element, a third lens element, a fourth lens element, a fifth lens element and a sixth lens element.

The first lens element can have positive refractive power and can have an object-side surface being convex in a paraxial region thereof. Therefore, the sufficient light converging ability can be provided and the strength of the positive refractive power can be adjusted so as to reduce the total track length of the photographing optical lens system. Furthermore, the object-side surface of the first lens element can include at least one concave critical point in an off-axial region thereof. Therefore, it is favorable for the incident light from larger field of view traveling into the photographing optical lens system so as to obtain the arrangement of wide field of view.

The second lens element with positive refractive power has an image-side surface being convex in a paraxial region thereof. Therefore, the arrangement with the compact size and large field of view can be obtained.

The third lens element can have negative refractive power, and can have an object-side surface being convex in a paraxial region thereof, and has an image-side surface being concave in a paraxial region thereof. Therefore, aberrations generated from the first lens element and the second lens element can be corrected. Furthermore, the image-side surface of the third lens element can include at least one convex critical point in an off-axial region thereof. Therefore, it is favorable for the incident light from larger field of view traveling into the photographing optical lens system so as to obtain the arrangement of wide field of view.

The fourth lens element with negative refractive power has an object-side surface being concave in a paraxial region thereof. Therefore, the main negative refractive power of the photographing optical lens system can be positioned closer to the image surface, so that the photosensitivity can be reduced and astigmatism can be corrected.

The fifth lens element with positive refractive power can have an object-side surface being convex in a paraxial region thereof, and has an image-side surface being convex in a paraxial region thereof. Therefore, the arrangement of the positive refractive power of the photographing optical lens system can be balanced so as to enhance image quality.

The sixth lens element with negative refractive power has an image-side surface being concave in a paraxial region thereof. Therefore, the principal point can be positioned closer to the object side, so that the back focal length can be reduced for better controlling the total track length. Furthermore, the image-side surface of the sixth lens element includes at least one convex critical point in an off-axial region thereof, so that off-axial aberrations can be corrected for enhancing image quality on the peripheral region thereof.

When a focal length of the third lens element is f3, and a focal length of the fourth lens element is f4, the following condition is satisfied: $-4.0 < f4/|f3|$. Therefore, the main negative refractive power can be positioned closer to the image surface by reducing the refractive power of the third lens element, so that the negative refractive power would not be positioned too close to the imaged object which may cause excessive sensitivity in the manufacturing tolerance of the third lens element and may limit its field of view due to the lens shape configuration of the third lens element. Preferably, the following condition can be satisfied: $-1.5 < f4/|f3|$. More preferably, the following condition can be satisfied: $-1.0 < f4/|f3|$. More preferably, the following condition can be satisfied: $-0.80 < f4/|f3|$.

When an axial distance between the third lens element and the fourth lens element is T34, and an axial distance between the fifth lens element and the sixth lens element is T56, the following condition is satisfied: $T56/T34 < 1.0$. Therefore, it is favorable for avoiding assembling problems of thin lens elements such as the third lens element and the fourth lens element, being too close to each other, so that the manufacturability of the photographing optical lens system can be enhanced. Preferably, the following condition can be satisfied: $T56/T34 < 0.40$.

When a curvature radius of an object-side surface of the second lens element is R3, and a curvature radius of the image-side surface of the second lens element is R4, the following condition is satisfied: $-0.70 < (R3+R4)/(R3-R4)$. Therefore, the arrangement of the second lens element is favorable for the incident light from larger field of view traveling into the photographing optical lens system, and aberrations generated from the first lens element can be corrected to improve image quality. Preferably, the following condition can be satisfied: $0.50 < (R3+R4)/(R3-R4) < 4.0$. More preferably, the following condition can be satisfied: $1.0 \leq (R3+R4)/(R3-R4) < 4.0$.

When a focal length of the photographing optical lens system is f, a focal length of the fifth lens element is f5, and a focal length of the sixth lens element is f6, the following condition is satisfied: $3.75 < (f/f5)+|f/f6| < 7.5$. Therefore, the main refractive power of the photographing optical lens system can be positioned toward the image surface so as to enable light converging favorably on the image surface.

When a focal length of the first lens element is f1, a focal length of the second lens element is f2, and the focal length of the fifth lens element is f5, the following condition is satisfied: $0.25 < (f5/f1)+(f5/f2) < 0.75$. Therefore, the main positive refractive power of the photographing optical lens system can be positioned toward the image surface so as to provide the arrangement of large field of view and reduce the photosensitivity of the first lens element and the second lens element effectively.

When a sum of axial distances between every two of the lens elements of the photographing optical lens system that are adjacent to each other is $\Sigma AT$, and the axial distance between the third lens element and the fourth lens element is T34, the following condition is satisfied: $1.0 < \Sigma AT/T34 < 2.0$. Therefore, the compact arrangement among the lens elements can be ensured so as to utilize space effectively for miniaturization.

When a curvature radius of the object-side surface of the third lens element is R5, a curvature radius of the image-side surface of the third lens element is R6, and the focal length of the photographing optical lens system is f, the following condition is satisfied: $0.80 < (R5+R6)/f < 2.0$. Therefore, it is favorable for reducing aberrations of the first lens element and the second lens element with the meniscus shape of the third lens element.

When an Abbe number of the third lens element is V3, an Abbe number of the fourth lens element is V4, and an Abbe number of the fifth lens element is V5, the following condition is satisfied: $(V3+V4)/V5 < 1.0$. Therefore, it is favorable for balancing corrections of chromatic aberration and astigmatism.

The photographing optical lens system can further include an aperture stop located between the first lens element and the third lens element. When an f-number of the photographing optical lens system is Fno, the following condition is satisfied: $1.20 < Fno < 2.45$. Therefore, it is favorable for balancing the brightness of the image surface and the depth of field of the image so as to ensure sufficient illumination with high image clarity.

When the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, and a focal length of the x-th lens element is fx, the following conditions are satisfied: $|f5| < |fx|$; and $|f6| < |fx|$, wherein $x=1, 2, 3, 4$. Therefore, the principal point can be positioned closer to the image surface so as to provide a large field of view.

When a curvature radius of the image-side surface of the third lens element is R6, a curvature radius of the object-side surface of the fourth lens element is R7, and the focal length of the photographing optical lens system is f, the following condition is satisfied: $(|R6|+|R7|)/f < 1.50$. Therefore, the imaging ability can be enhanced by the aspheric characteristics of the third lens element and the fourth lens element.

When the focal length of the photographing optical lens system is f, and a curvature radius of the object-side surface of the sixth lens element is R11, the following condition is satisfied: $f/R11 < 0.60$. Therefore, the excessive variation of the surface shape of the sixth lens element can be avoided which would generate ghost images and surface reflections.

When the focal length of the photographing optical lens system is f, and a vertical distance between a maximum effective radius position on the image-side surface of the sixth lens element and an optical axis is SD62, the following condition is satisfied: 0.80<f/SD62<1.30. Therefore, the photographing optical lens system can provide the arrangements of large field of view and lens compactness.

Each of the aforementioned features of the photographing optical lens system can be utilized in numerous combinations, so as to achieve the corresponding effects.

According to the photographing optical lens system of the present disclosure, the lens elements thereof can be made of glass or plastic materials. When the lens elements are made of glass materials, the distribution of the refractive power of the photographing optical lens system may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the photographing optical lens system. Therefore, the total track length of the photographing optical lens system can also be reduced.

According to the photographing optical lens system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the photographing optical lens system of the present disclosure, the refractive power or the focal length of a lens element being positive or negative may refer to the refractive power or the focal length in a paraxial region of the lens element.

According to the photographing optical lens system of the present disclosure, the photographing optical lens system can include at least one stop, such as an aperture stop, a glare stop or a field stop. Said glare stop or said field stop is for eliminating the stray light and thereby improving the image resolution thereof.

According to the photographing optical lens system of the present disclosure, the image surface of the photographing optical lens system, based on the corresponding image sensor, can be flat or curved. In particular, the image surface can be a concave curved surface facing towards the object side.

According to the photographing optical lens system of the present disclosure, an aperture stop can be configured as a front stop or a middle stop. A front stop disposed between an object and the first lens element can provide a longer distance between an exit pupil of the photographing optical lens system and the image surface, and thereby obtains a telecentric effect and improves the image-sensing efficiency of the image sensor, such as CCD or CMOS. A middle stop disposed between the first lens element and the image surface is favorable for enlarging the field of view of the photographing optical lens system and thereby provides a wider field of view for the same.

According to the photographing optical lens system of the present disclosure, a critical point is a non-axial point of the lens surface where its tangent is perpendicular to the optical axis, wherein a convex critical point is a critical point located on a convex shape of the lens surface, and the shape of the critical point (convex or concave) is determined by the positive or negative sign of the curvature at the critical point.

According to the photographing optical lens system of the present disclosure, the photographing optical lens system can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing apparatus is provided. The image capturing apparatus includes the aforementioned photographing optical lens system and an image sensor, wherein the image sensor is disposed on the image side of the aforementioned photographing optical lens system, that is, the image sensor can be disposed on or near the image surface of the aforementioned photographing optical lens system. By arranging the second lens element with positive refractive power, the arrangement of lens compactness and large field of view can be obtained. By reducing the refractive power of the third lens element, it is favorable for avoiding the negative refractive power being positioned too close to the imaged object, which may cause overly sensitive manufacturing tolerance of the third lens element, and avoiding limited field of view due to a poor lens shape configuration. Preferably, the image capturing apparatus can further include a barrel member, a holder member or a combination thereof.

According to the present disclosure, an electronic device is provided, which includes the aforementioned image capturing apparatus. Preferably, the electronic device can further include but not limited to a control unit, a display, a storage unit, a random access memory unit (RAM) or a combination thereof.

According to the above description of the present disclosure, the following 1st-12th specific embodiments are provided for further explanation.

1st Embodiment

Figure 2:
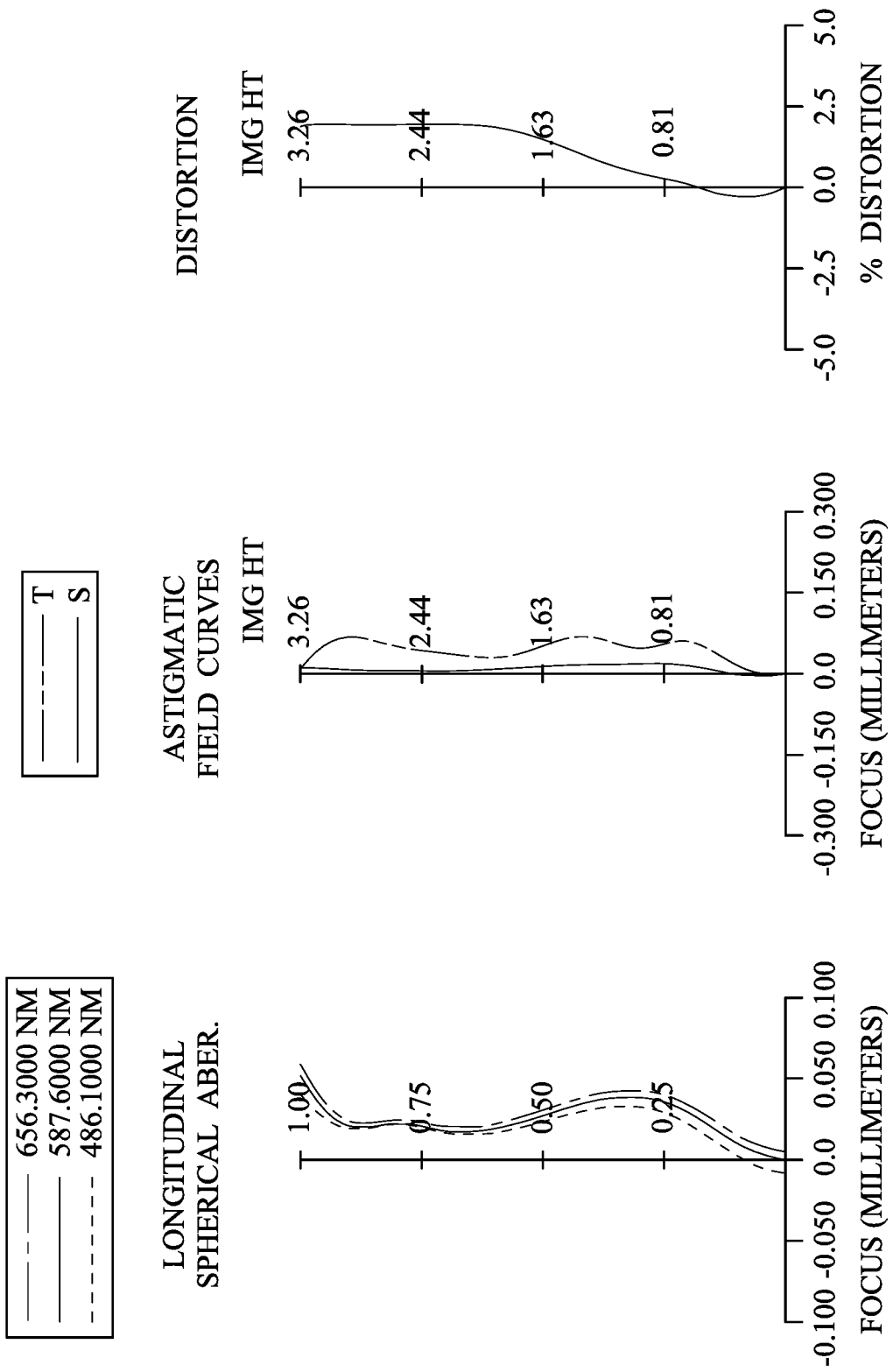
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows spherical aberration curves, astigmatic field curves and a distortion curve of the image capturing apparatus according to the 1st embodiment. In FIG. 1, the image capturing apparatus includes a photographing optical lens system (its reference numeral is omitted) and an image sensor 190. The photographing optical lens system includes, in order from an object side to an image side, a first lens element 110, an aperture stop 100, a second lens element 120, a stop 101, a third lens element 130, a fourth lens element 140, a fifth lens element 150, a sixth lens element 160, an IR-cut filter 170 and an image surface 180, wherein the image sensor 190 is disposed on the image surface 180 of the photographing optical lens system. The photographing optical lens system includes six lens elements (110, 120, 130, 140, 150, and 160) without additional one or more lens elements inserted between the first lens element 110 and the sixth lens element 160.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric. Furthermore, the object-side surface 111 of the first lens element 110 includes at least one concave critical point in an off-axial region thereof.

The second lens element 120 with positive refractive power has an object-side surface 121 being concave in a paraxial region thereof and an image-side surface 122 being convex in a paraxial region thereof. The second lens element 120 is made of a plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric. Furthermore, the image-side surface 132 of the third lens element 130 includes at least one convex critical point in an off-axial region thereof.

The fourth lens element 140 with negative refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex critical point in an off-axial region thereof.

The IR-cut filter 170 is made of a glass material and located between the sixth lens element 160 and the image surface 180, and will not affect the focal length of the photographing optical lens system.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens system according to the 1st embodiment, when a focal length of the photographing optical lens system is f, an f-number of the photographing optical lens system is Fno, and half of a maximum field of view of the photographing optical lens system is HFOV, these parameters have the following values: f=3.07 mm; Fno=1.95; and HFOV=46.0 degrees.

In the photographing optical lens system according to the 1st embodiment, when an Abbe number of the third lens element 130 is V3, an Abbe number of the fourth lens element 140 is V4, and an Abbe number of the fifth lens element 150 is V5, the following condition is satisfied: (V3+V4)/V5=0.88.

In the photographing optical lens system according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, and a sum of axial distances between every two of the lens elements of the photographing optical lens system that are adjacent to each other is ΣAT, (that is, ΣAT=T12+T23+T34+T45+T56), the following conditions are satisfied: T56/T34=0.06; and ΣAT/T34=1.50.

In the photographing optical lens system according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=1.63.

In the photographing optical lens system according to the 1st embodiment, when the focal length of the photographing optical lens system is f, a curvature radius of the object-side surface 131 of the third lens element 130 is R5, a curvature radius of the image-side surface 132 of the third lens element 130 is R6, and a curvature radius of the object-side surface 141 of the fourth lens element 140 is R7, the following conditions are satisfied: (R5+R6)/f=1.40; and (|R6|+|R7|)/f=1.03.

In the photographing optical lens system according to the 1st embodiment, when a focal length of the third lens element 130 is f3, and a focal length of the fourth lens element 140 is f4, the following condition is satisfied: f4/|f3|=−0.64.

In the photographing optical lens system according to the 1st embodiment, when a focal length of the first lens element 110 is f1, a focal length of the second lens element 120 is f2, a focal length of the fifth lens element 150 is f5, a focal length of the sixth lens element 160 is f6, the focal length of the photographing optical lens system is f, and the following conditions are satisfied: (f5/f1)+(f5/f2)=0.48; and (f/f5)+|f/f6|=4.55.

In the photographing optical lens system according to the 1st embodiment, when the focal length of the photographing optical lens system is f, and a curvature radius of the object-side surface 161 of the sixth lens element 160 is R11, the following condition is satisfied: f/R11=0.26.

Figure 17:
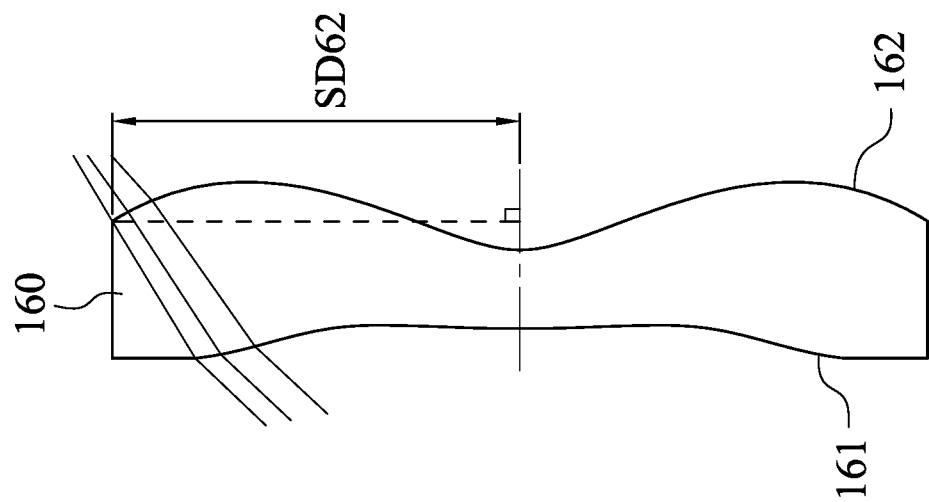
FIG. 17 is a schematic view of a parameter SD62 according to the 1st embodiment of FIG. 1.

FIG. 17 is a schematic view of a parameter SD62 according to the 1st embodiment of FIG. 1. In FIG. 17, when a vertical distance between a maximum effective radius position on the image-side surface 162 of the sixth lens element 160 and an optical axis is SD62, and the focal length of the photographing optical lens system is f, the following condition is satisfied: f/SD62=1.18.

The detailed optical data of the 1st embodiment are shown in Table 1 and the aspheric surface data are shown in Table 2 below.

TABLE 1

1st Embodiment
f = 3.07 mm, Fno = 1.95, HFOV = 46.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.246 | ASP | 0.275 | Plastic | 1.545 | 56.1 | 6.15 |
| 2 | | 100.000 | ASP | −0.026 | | | | |
| 3 | Ape. Stop | Plano | | 0.180 | | | | |
| 4 | Lens 2 | −8.083 | ASP | 0.494 | Plastic | 1.534 | 55.9 | 4.65 |
| 5 | | −1.940 | ASP | −0.235 | | | | |
| 6 | Stop | Plano | | 0.265 | | | | |
| 7 | Lens 3 | 2.634 | ASP | 0.240 | Plastic | 1.639 | 23.5 | −7.64 |
| 8 | | 1.650 | ASP | 0.487 | | | | |
| 9 | Lens 4 | −1.509 | ASP | 0.286 | Plastic | 1.614 | 26.0 | −4.92 |
| 10 | | −3.235 | ASP | 0.030 | | | | |
| 11 | Lens 5 | −82.771 | ASP | 0.756 | Plastic | 1.544 | 56.0 | 1.27 |
| 12 | | −0.686 | ASP | 0.030 | | | | |
| 13 | Lens 6 | 11.827 | ASP | 0.500 | Plastic | 1.544 | 56.0 | −1.44 |
| 14 | | 0.724 | ASP | 0.600 | | | | |
| 15 | IR-cut filter | Plano | | 0.100 | Glass | 1.517 | 64.2 | — |
| 16 | | Plano | | 0.656 | | | | |
| 17 | Image | Plano | | — | | | | |

Reference wavelength is 587.6 nm (d-line).
Effective radius of Stop on Surface 6 is 0.900 mm.

TABLE 2

Aspheric Coefficients

| Surface # | 1 | 2 | 4 | 5 | 7 | 8 |
|---|---|---|---|---|---|---|
| k = | 4.4546E+00 | −9.0000E+01 | 7.3713E+01 | 4.2174E−01 | −8.5907E+01 | −1.4112E+01 |
| A4 = | −1.1948E−01 | −1.1399E−01 | 5.0529E−02 | −5.8051E−03 | 1.4945E−01 | 1.0784E−01 |
| A6 = | −1.6719E−01 | −7.0465E−02 | −9.2977E−02 | −1.1390E−01 | −1.3734E+00 | −4.9897E−01 |
| A8 = | 3.0792E−01 | −7.0072E−02 | 4.1590E−01 | −8.6648E−02 | 3.1165E+00 | 8.6308E−01 |
| A10 = | −7.9723E−01 | 2.3293E−01 | −1.8937E+00 | 8.5121E−01 | −4.7471E+00 | −9.8713E−01 |
| A12 = | 8.8593E−01 | −1.6088E−01 | 4.0650E+00 | −2.3342E+00 | 4.0731E+00 | 7.3034E−01 |
| A14 = | −3.0794E−01 | 9.6032E−02 | −3.9842E+00 | 2.7021E+00 | −1.5538E+00 | −3.0982E−01 |
| A16 = | | | 1.3023E+00 | −1.1989E+00 | 1.3436E−01 | 5.4519E−02 |

| Surface # | 9 | 10 | 11 | 12 | 13 | 14 |
|---|---|---|---|---|---|---|
| k = | −3.4420E+00 | −7.1120E+01 | −9.0000E+01 | −3.1443E+00 | −6.9630E+00 | −5.5435E+00 |
| A4 = | 1.5050E−01 | −1.2599E−01 | −1.8179E−01 | −6.8708E−02 | 8.0343E−03 | −4.2621E−02 |
| A6 = | −7.8198E−01 | 3.1902E−02 | 4.8169E−02 | −5.5956E−02 | −4.6193E−02 | 1.0830E−02 |
| A8 = | 1.6475E+00 | 4.4577E−02 | −6.2340E−01 | 2.9046E−01 | 1.6616E−02 | −3.3854E−03 |
| A10 = | −1.7224E+00 | −2.5845E−01 | 4.7701E−01 | −2.4627E−01 | −1.1386E−03 | 8.4739E−04 |
| A12 = | 1.0512E+00 | 3.4276E−01 | −2.1863E−01 | 9.3501E−02 | −4.0754E−04 | −1.3887E−04 |
| A14 = | −3.8522E−01 | −1.8938E−01 | 5.3906E−02 | −1.7163E−02 | 8.4328E−05 | 1.2630E−05 |
| A16 = | 6.7740E−02 | 4.0167E−02 | −5.5184E−03 | 1.2347E−03 | −4.8221E−06 | −4.7645E−07 |

In Table 1, the curvature radius, the thickness and the focal length are shown in millimeters (mm). Surface numbers 0-17 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, in the photographing optical lens system according to the 1st embodiment, the focal length of the first lens element 110 is f1, the focal length of the second lens element 120 is f2, the focal length of the third lens element 130 is f3, the focal length of the fourth lens element 140 is f4, the focal length of the fifth lens element 150 is f5, the focal length of the sixth lens element 160 is f6, and a focal length of the x-th lens element is fx, the following conditions are satisfied: $|f5|<|fx|$; and $|f6|<|fx|$, wherein x=1, 2, 3, 4.

2nd Embodiment

Figure 3:
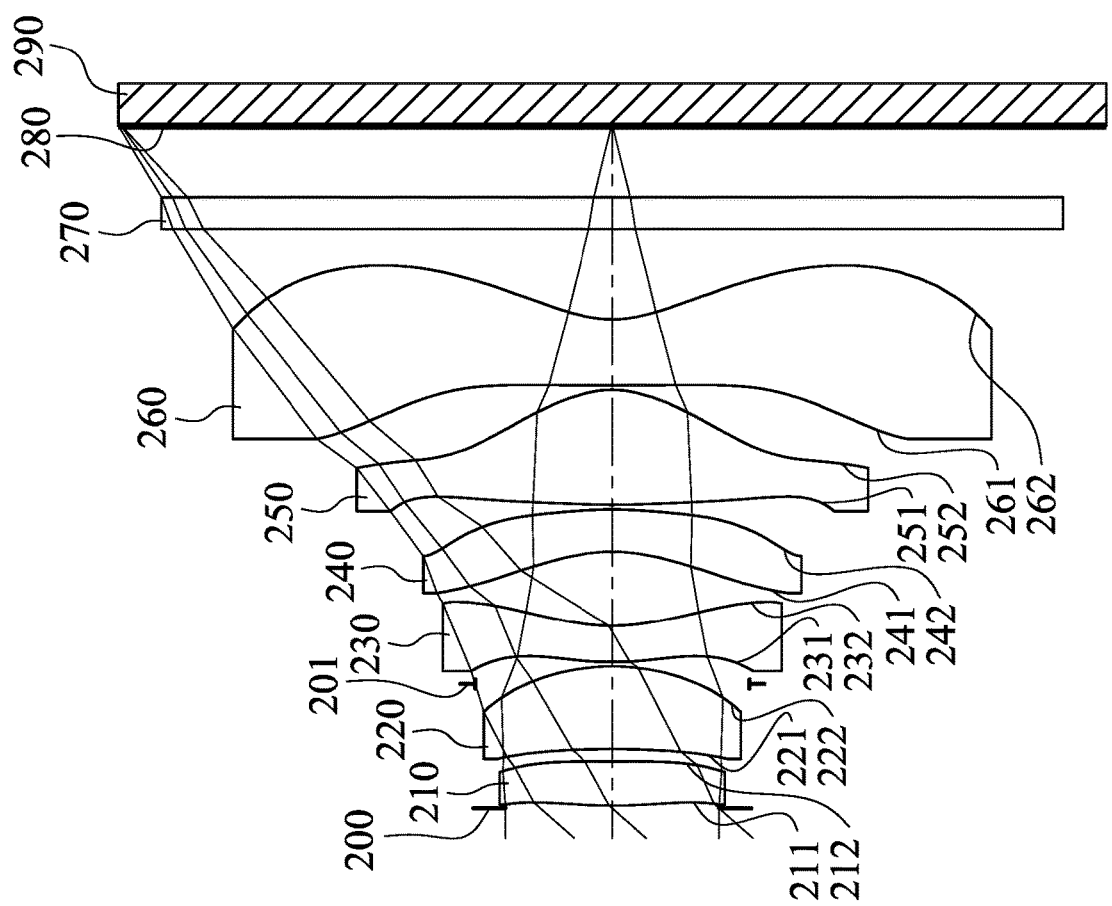
FIG. 3 is a schematic view of an image capturing apparatus according to the 2nd embodiment of the present disclosure.
Figure 4:
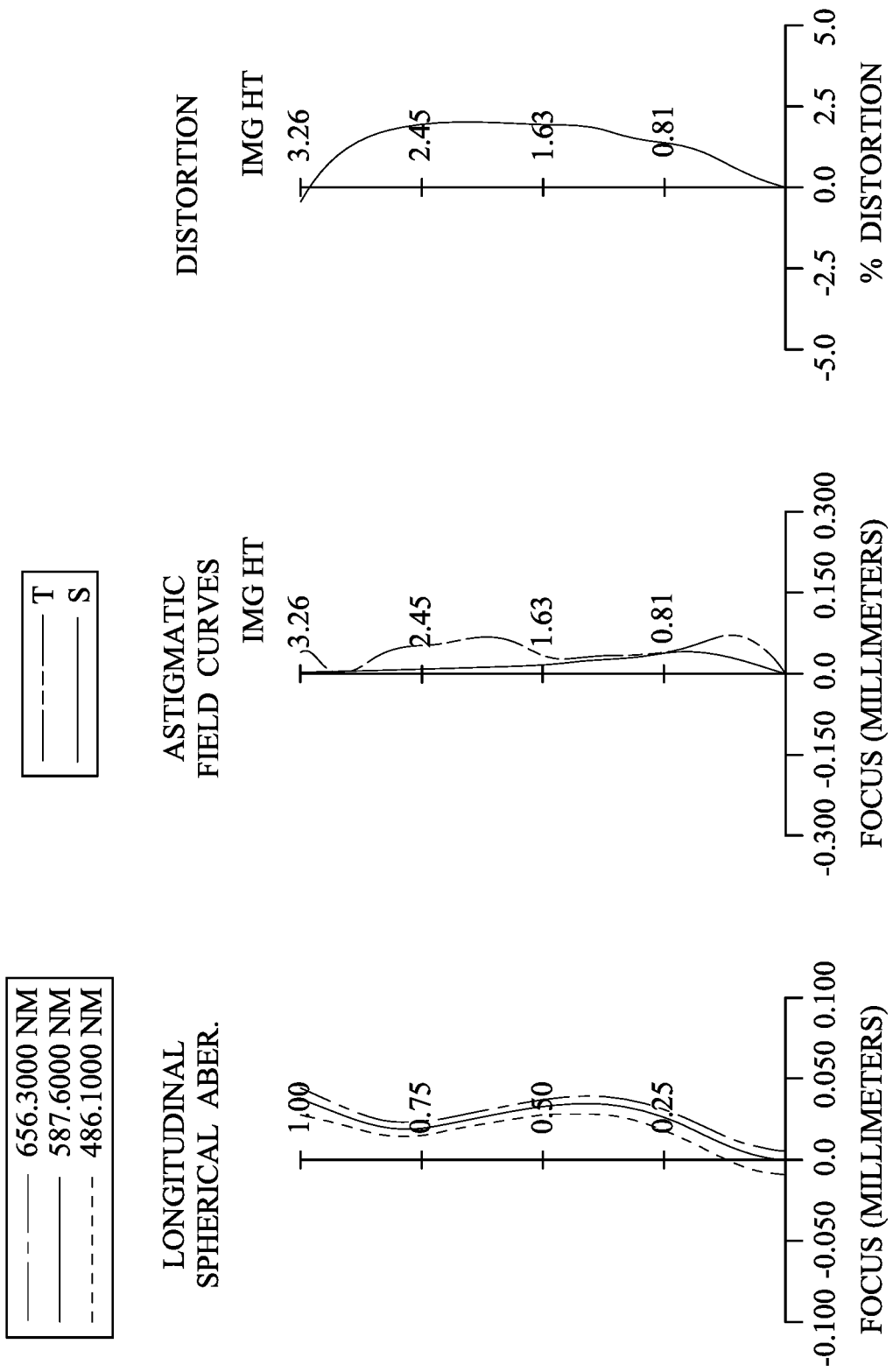
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows spherical aberration curves, astigmatic field curves and a distortion curve of the image capturing apparatus according to the 2nd embodiment. In FIG. 3, the image capturing apparatus includes a photographing optical lens system (its reference numeral is omitted) and an image sensor 290. The photographing optical lens system includes, in order from an object side to an image side, an aperture stop 200, a first lens element 210, a second lens element 220, a stop 201, a third lens element 230, a fourth lens element 240, a fifth lens element 250, a sixth lens element 260, an IR-cut filter 270 and an image surface 280, wherein the image sensor 290 is disposed on the image surface 280 of the photographing optical lens system. The photographing optical lens system includes six lens elements (210, 220, 230, 240, 250, and 260) without additional one or more lens elements inserted between the first lens element 210 and the sixth lens element 260.

The first lens element 210 with positive refractive power has an object-side surface 211 being convex in a paraxial region thereof and an image-side surface 212 being planar in a paraxial region thereof. The first lens element 210 is made of a plastic material, and has the object-side surface 211 and the image-side surface 212 being both aspheric. Furthermore, the object-side surface 211 of the first lens element 210 includes at least one concave critical point in an off-axial region thereof.

The second lens element 220 with positive refractive power has an object-side surface 221 being concave in a paraxial region thereof and an image-side surface 222 being convex in a paraxial region thereof. The second lens element 220 is made of a plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric. Furthermore, the image-side surface 232 of the third lens element 230 includes at least one convex critical point in an off-axial region thereof.

The fourth lens element 240 with negative refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex critical point in an off-axial region thereof.

The IR-cut filter 270 is made of a glass material and located between the sixth lens element 260 and the image surface 280, and will not affect the focal length of the photographing optical lens system.

The detailed optical data of the 2nd embodiment are shown in Table 3 and the aspheric surface data are shown in Table 4 below.

TABLE 3

2nd Embodiment
f = 2.88 mm, Fno = 2.03, HFOV = 48.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.018 | | | | |
| 2 | Lens 1 | 3.748 | ASP | 0.292 | Plastic | 1.559 | 40.4 | 6.71 |
| 3 | | ∞ | ASP | 0.084 | | | | |
| 4 | Lens 2 | −5.742 | ASP | 0.548 | Plastic | 1.544 | 56.0 | 3.37 |
| 5 | | −1.436 | ASP | −0.118 | | | | |
| 6 | Stop | Plano | | 0.148 | | | | |
| 7 | Lens 3 | 2.294 | ASP | 0.240 | Plastic | 1.660 | 20.4 | −6.55 |
| 8 | | 1.436 | ASP | 0.493 | | | | |
| 9 | Lens 4 | −1.112 | ASP | 0.281 | Plastic | 1.634 | 23.8 | −3.29 |
| 10 | | −2.616 | ASP | 0.030 | | | | |
| 11 | Lens 5 | 5.260 | ASP | 0.763 | Plastic | 1.559 | 40.4 | 1.13 |
| 12 | | −0.680 | ASP | 0.030 | | | | |
| 13 | Lens 6 | −100.000 | ASP | 0.440 | Plastic | 1.559 | 40.4 | −1.31 |
| 14 | | 0.739 | ASP | 0.600 | | | | |
| 15 | IR-cut filter | Plano | | 0.210 | Glass | 1.517 | 64.2 | — |
| 16 | | Plano | | 0.474 | | | | |
| 17 | Image | Plano | | — | | | | |

Reference wavelength is 587.6 nm (d-line).
Effective radius of Stop on Surface 6 is 0.910 mm.

TABLE 4

Aspheric Coefficients

| Surface # | 2 | 3 | 4 | 5 | 7 | 8 |
|---|---|---|---|---|---|---|
| k = | 1.9906E+01 | 0.0000E+00 | 1.4129E+01 | −1.9719E−02 | −4.8119E+01 | −8.9165E+00 |
| A4 = | −2.0017E−01 | −1.5246E−01 | 6.3364E−02 | 6.4676E−02 | 1.5915E−01 | 7.8868E−02 |
| A6 = | −2.3112E−01 | −3.9093E−01 | −4.9512E−01 | −2.3206E−01 | −1.4659E+00 | −5.0750E−01 |
| A8 = | 7.3478E−02 | 3.6156E−01 | 1.0393E+00 | 3.1032E−02 | 3.2325E+00 | 9.2034E−01 |
| A10 = | −4.8673E−01 | 2.9763E−01 | −2.0033E+00 | 9.3167E−01 | −4.7837E+00 | −1.0448E+00 |

TABLE 4-continued

| Aspheric Coefficients | | | | | |
|---|---|---|---|---|---|
| A12 = | 6.1186E−01 | −6.3883E−01 | 3.8375E+00 | −2.3542E+00 | 4.0793E+00 | 7.4129E−01 |
| A14 = | −3.1013E−01 | 7.2071E−01 | −4.0867E+00 | 2.3405E+00 | −1.5888E+00 | −2.9072E−01 |
| A16 = | | | 1.6907E+00 | −8.8840E−01 | 1.5620E−01 | 4.4192E−02 |

| Surface # | 9 | 10 | 11 | 12 | 13 | 14 |
|---|---|---|---|---|---|---|
| k = | −5.9467E+00 | −9.0000E+01 | −6.2709E+00 | −3.3649E+00 | 9.0000E+01 | −5.6993E+00 |
| A4 = | 1.8961E−01 | −3.9291E−02 | −2.1617E−01 | −4.9540E−02 | 8.1588E−02 | −4.7351E−02 |
| A6 = | −9.4785E−01 | −3.8080E−02 | 4.8859E−01 | −4.5638E−02 | −1.8933E−01 | −3.0041E−03 |
| A8 = | 2.1338E+00 | −1.2549E−01 | −6.1926E−01 | 2.8295E−01 | 1.2491E−01 | 7.3871E−03 |
| A10 = | −2.4481E+00 | 1.5044E−01 | 4.7357E−01 | −2.4684E−01 | −4.4704E−02 | −2.8235E−03 |
| A12 = | 1.5748E+00 | −4.0637E−02 | −2.1780E−01 | 9.3781E−02 | 9.4973E−03 | 5.2577E−04 |
| A14 = | −5.4859E−01 | −1.7846E−02 | 5.3649E−02 | −1.6988E−02 | −1.1118E−03 | −5.0156E−05 |
| A16 = | 8.1226E−02 | 1.0729E−02 | −5.4416E−03 | 1.2002E−03 | 5.4654E−05 | 1.9479E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.88 | (R5 + R6)/f | 1.30 |
| Fno | 2.03 | (|R6| + |R7|)/f | 0.88 |
| HFOV [deg.] | 48.5 | f4/|f3| | −0.50 |
| (V3 + V4)/V5 | 1.09 | (f5/f1) + (f5/f2) | 0.50 |
| T56/T34 | 0.06 | (f/f5) + |f/f6| | 4.75 |
| ΣAT/T34 | 1.35 | f/R11 | −0.03 |
| (R3 + R4)/(R3 − R4) | 1.67 | f/SD62 | 1.14 |

Furthermore, in the photographing optical lens system according to the 2nd embodiment, the focal length of the first lens element 210 is f1, the focal length of the second lens element 220 is f2, the focal length of the third lens element 230 is f3, the focal length of the fourth lens element 240 is f4, the focal length of the fifth lens element 250 is f5, the focal length of the sixth lens element 260 is f6, and a focal length of the x-th lens element is fx, the following conditions are satisfied: |f5|<|fx|; and |f6|<|fx|, wherein x=1, 2, 3, 4.

3rd Embodiment

Figure 5:
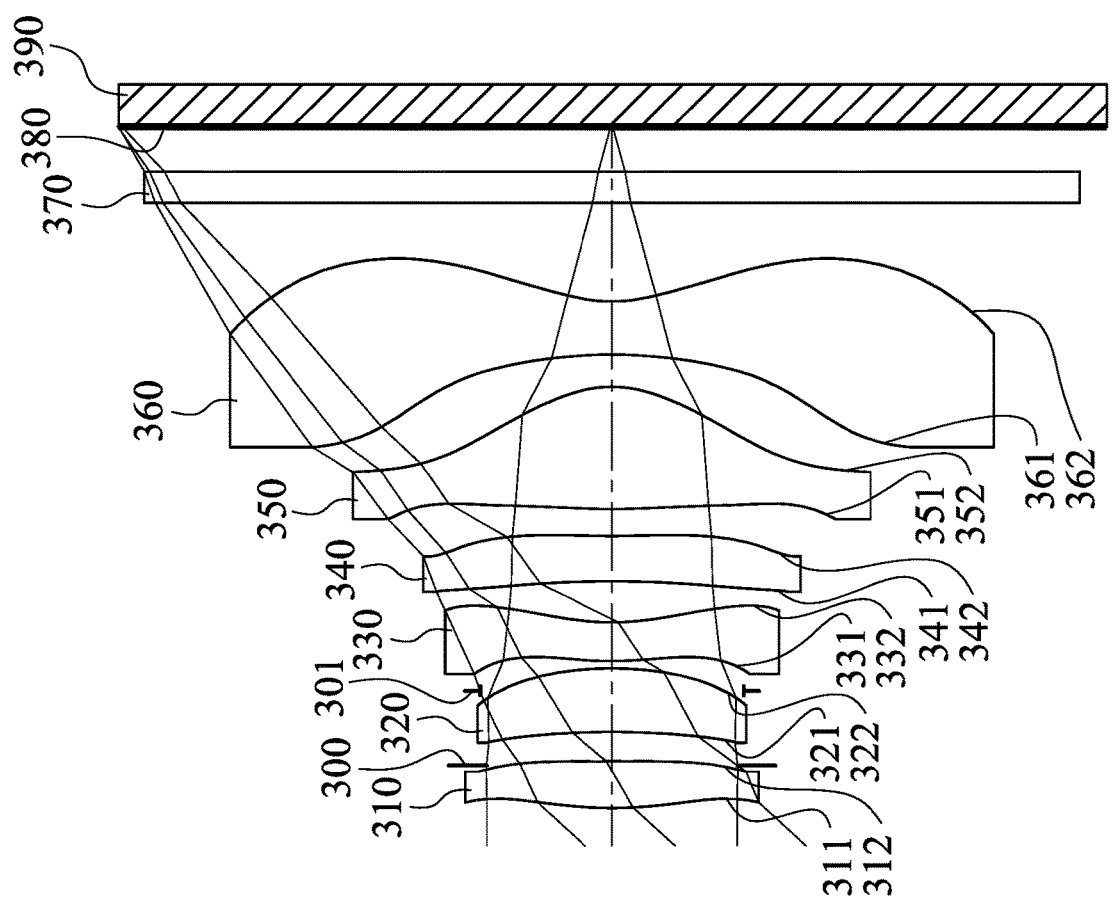
FIG. 5 is a schematic view of an image capturing apparatus according to the 3rd embodiment of the present disclosure.
Figure 6:
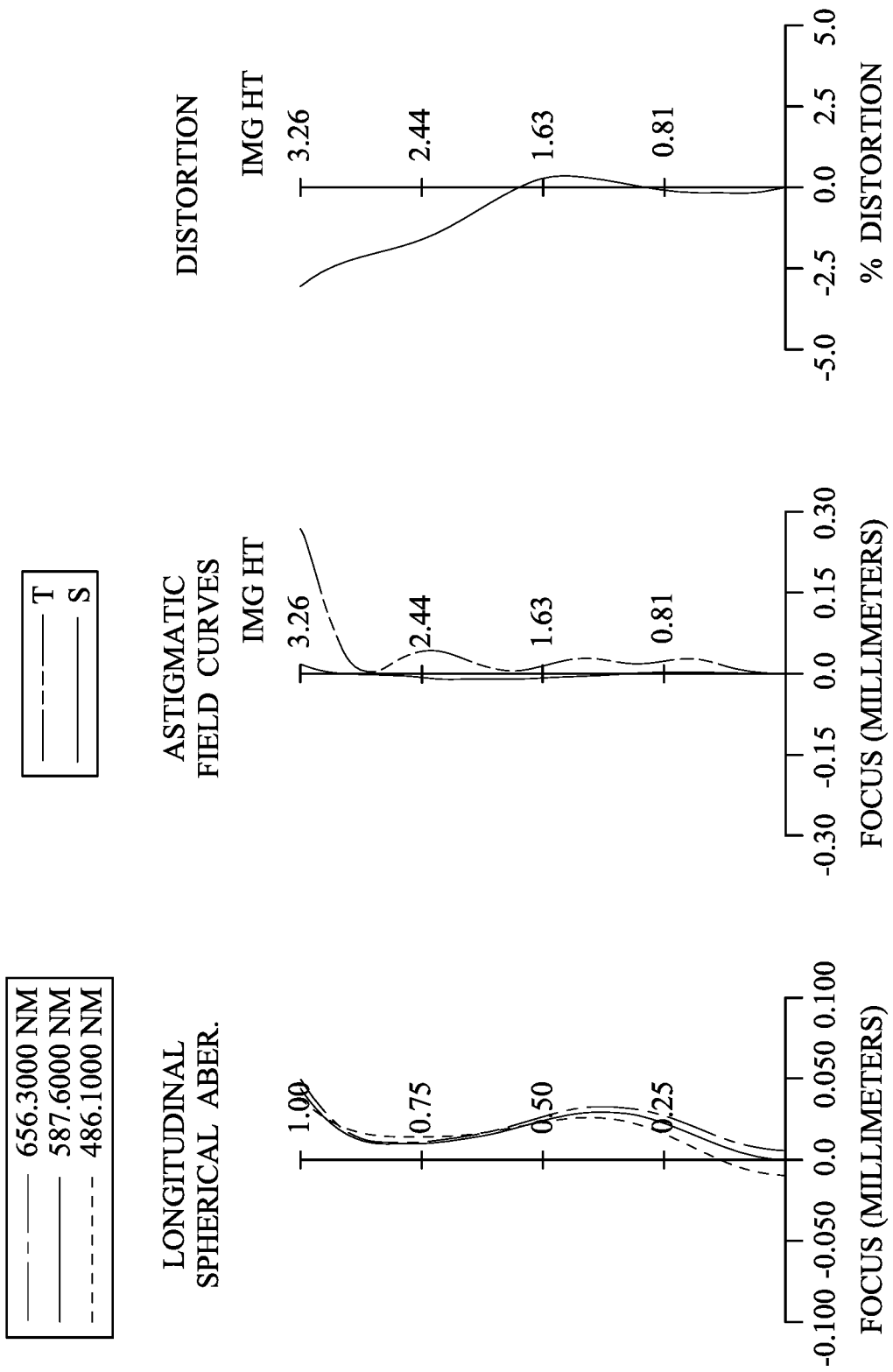
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows spherical aberration curves, astigmatic field curves and a distortion curve of the image capturing apparatus according to the 3rd embodiment. In FIG. 5, the image capturing apparatus includes a photographing optical lens system (its reference numeral is omitted) and an image sensor 390. The photographing optical lens system includes, in order from an object side to an image side, a first lens element 310, an aperture stop 300, a second lens element 320, a stop 301, a third lens element 330, a fourth lens element 340, a fifth lens element 350, a sixth lens element 360, an IR-cut filter 370 and an image surface 380, wherein the image sensor 390 is disposed on the image surface 380 of the photographing optical lens system. The photographing optical lens system includes six lens elements (310, 320, 330, 340, 350, and 360) without additional one or more lens elements inserted between the first lens element 310 and the sixth lens element 360.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric. Furthermore, the object-side surface 311 of the first lens element 310 includes at least one concave critical point in an off-axial region thereof.

The second lens element 320 with positive refractive power has an object-side surface 321 being concave in a paraxial region thereof and an image-side surface 322 being convex in a paraxial region thereof. The second lens element 320 is made of a plastic material, and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric. Furthermore, the image-side surface 332 of the third lens element 330 includes at least one convex critical point in an off-axial region thereof.

The fourth lens element 340 with negative refractive power has an object-side surface 341 being concave in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being concave in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex critical point in an off-axial region thereof.

The IR-cut filter 370 is made of a glass material and located between the sixth lens element 360 and the image surface 380, and will not affect the focal length of the photographing optical lens system.

The detailed optical data of the 3rd embodiment are shown in Table 5 and the aspheric surface data are shown in Table 6 below.

TABLE 5

3rd Embodiment
f = 3.07 mm, Fno = 1.86, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.784 | ASP | 0.312 | Plastic | 1.545 | 56.0 | 5.15 |
| 2 | | 352.016 | ASP | −0.030 | | | | |
| 3 | Ape. Stop | Plano | | 0.223 | | | | |
| 4 | Lens 2 | −5.163 | ASP | 0.419 | Plastic | 1.544 | 55.9 | 9.74 |
| 5 | | −2.689 | ASP | −0.148 | | | | |
| 6 | Stop | Plano | | 0.198 | | | | |
| 7 | Lens 3 | 2.447 | ASP | 0.255 | Plastic | 1.660 | 20.4 | −13.00 |
| 8 | | 1.825 | ASP | 0.269 | | | | |
| 9 | Lens 4 | −11.616 | ASP | 0.300 | Plastic | 1.639 | 23.5 | −5.21 |
| 10 | | 4.714 | ASP | 0.176 | | | | |
| 11 | Lens 5 | 3.663 | ASP | 0.811 | Plastic | 1.544 | 55.9 | 1.27 |
| 12 | | −0.784 | ASP | 0.213 | | | | |
| 13 | Lens 6 | −2.884 | ASP | 0.350 | Plastic | 1.544 | 55.9 | −1.32 |
| 14 | | 0.993 | ASP | 0.650 | | | | |
| 15 | IR-cut filter | Plano | | 0.210 | Glass | 1.517 | 64.2 | — |
| 16 | | Plano | | 0.295 | | | | |
| 17 | Image | Plano | | — | | | | |

Reference wavelength is 587.6 nm (d-line).
Effective radius of Stop on Surface 6 is 0.870 mm.

TABLE 6

Aspheric Coefficients

| Surface # | 1 | 2 | 4 | 5 | 7 | 8 |
|---|---|---|---|---|---|---|
| k = | −5.0264E+00 | 9.0000E+01 | −6.2009E+01 | −1.2672E+00 | −3.1743E+01 | −7.5462E+00 |
| A4 = | −6.1488E−02 | −9.2151E−02 | −2.0263E−02 | −2.3732E−01 | −1.6154E−01 | 1.2278E−05 |
| A6 = | −5.3689E−02 | −1.1544E−01 | −4.5953E−03 | 3.4808E−01 | −4.5578E−01 | −3.9393E−01 |
| A8 = | −2.9959E−02 | 2.1625E−01 | −6.1120E−02 | −4.4297E−01 | 8.3500E−01 | 6.8269E−01 |
| A10 = | −8.9024E−02 | −3.0893E−01 | 1.9716E−01 | 2.0668E−01 | −7.2029E−01 | −5.5349E−01 |
| A12 = | 1.0338E−01 | 2.1201E−01 | −2.3824E−01 | −6.8185E−02 | 2.3571E−02 | 1.9083E−01 |
| A14 = | | | | | 2.2626E−01 | −2.2355E−02 |

| Surface # | 9 | 10 | 11 | 12 | 13 | 14 |
|---|---|---|---|---|---|---|
| k = | 1.8090E+01 | 2.9822E+00 | −3.3705E+01 | −3.2481E+00 | −4.0116E+01 | −7.2188E+00 |
| A4 = | −2.3670E−01 | −6.0461E−01 | −3.5299E−01 | −7.0069E−02 | −7.3717E−02 | −3.9387E−02 |
| A6 = | 1.0470E+00 | 1.5550E+00 | 8.2541E−01 | 2.6502E−02 | 7.0775E−02 | −1.7549E−03 |
| A8 = | −2.5281E+00 | −2.8053E+00 | −1.0145E+00 | 1.0619E−01 | −1.2563E−01 | 2.8509E−03 |
| A10 = | 3.6182E+00 | 3.0323E+00 | 7.3820E−01 | −9.7923E−02 | 8.6242E−02 | −8.3115E−04 |
| A12 = | −2.9626E+00 | −1.9799E+00 | −3.2523E−01 | 3.6557E−02 | −2.6884E−02 | 1.3031E−04 |
| A14 = | 1.2849E+00 | 7.2894E−01 | 7.8258E−02 | −6.5095E−03 | 3.9936E−03 | −1.1605E−05 |
| A16 = | −2.3079E−01 | −1.1401E−01 | −7.7332E−03 | 4.5521E−04 | −2.3153E−04 | 4.5252E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.07 | (R5 + R6)/f | 1.39 |
| Fno | 1.86 | (|R6| + |R7|)/f | 4.38 |
| HFOV [deg.] | 47.5 | f4/|f3| | −0.40 |
| (V3 + V4)/V5 | 0.79 | (f5/f1) + (f5/f2) | 0.38 |

-continued

| 3rd Embodiment | | | |
|---|---|---|---|
| T56/T34 | 0.79 | (f/f5) + |f/f6| | 4.74 |
| ΣAT/T34 | 3.35 | f/R11 | −1.06 |
| (R3 + R4)/(R3 − R4) | 3.17 | f/SD62 | 1.22 |

Furthermore, in the photographing optical lens system according to the 3rd embodiment, the focal length of the first lens element 310 is f1, the focal length of the second lens element 320 is f2, the focal length of the third lens element 330 is f3, the focal length of the fourth lens element 340 is f4, the focal length of the fifth lens element 350 is f5, the focal length of the sixth lens element 360 is f6, and a focal length of the x-th lens element is fx, the following conditions are satisfied: |f5|<|fx|; and |f6|<|fx|, wherein x=1, 2, 3, 4.

4th Embodiment

Figure 7:
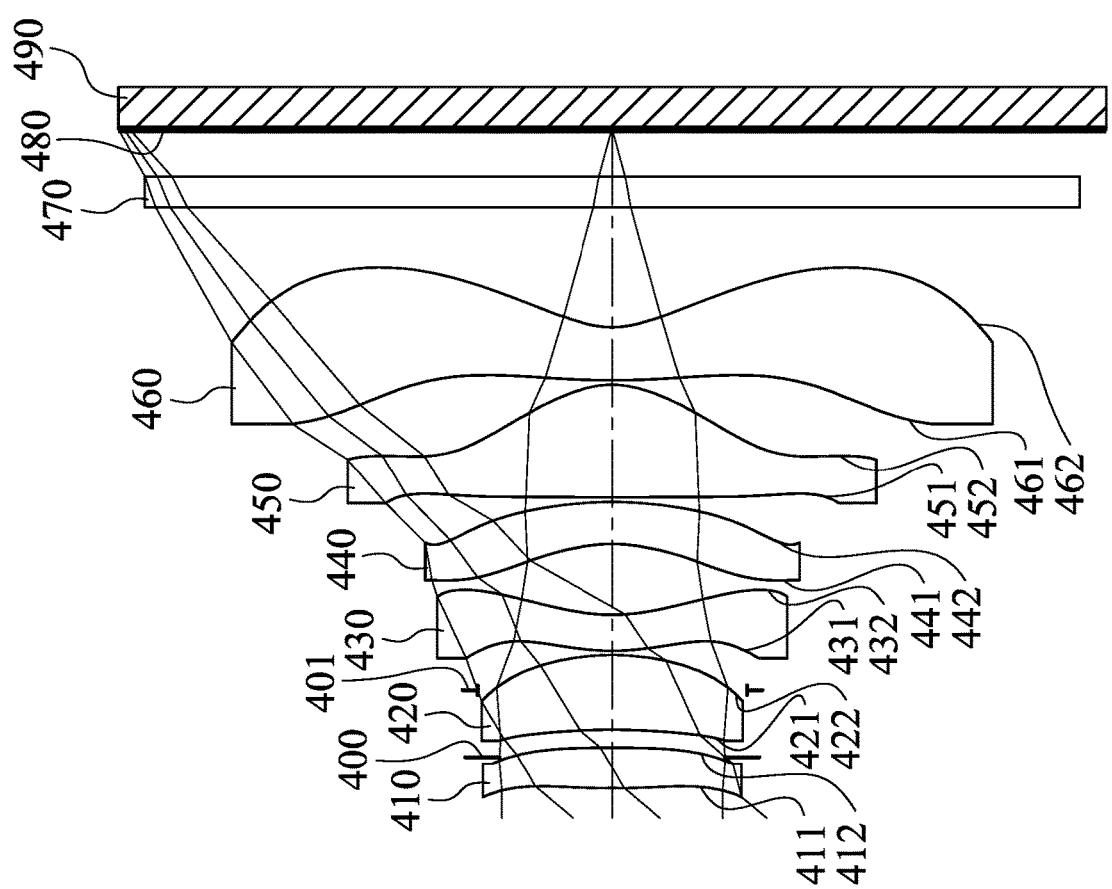
FIG. 7 is a schematic view of an image capturing apparatus according to the 4th embodiment of the present disclosure.
Figure 8:
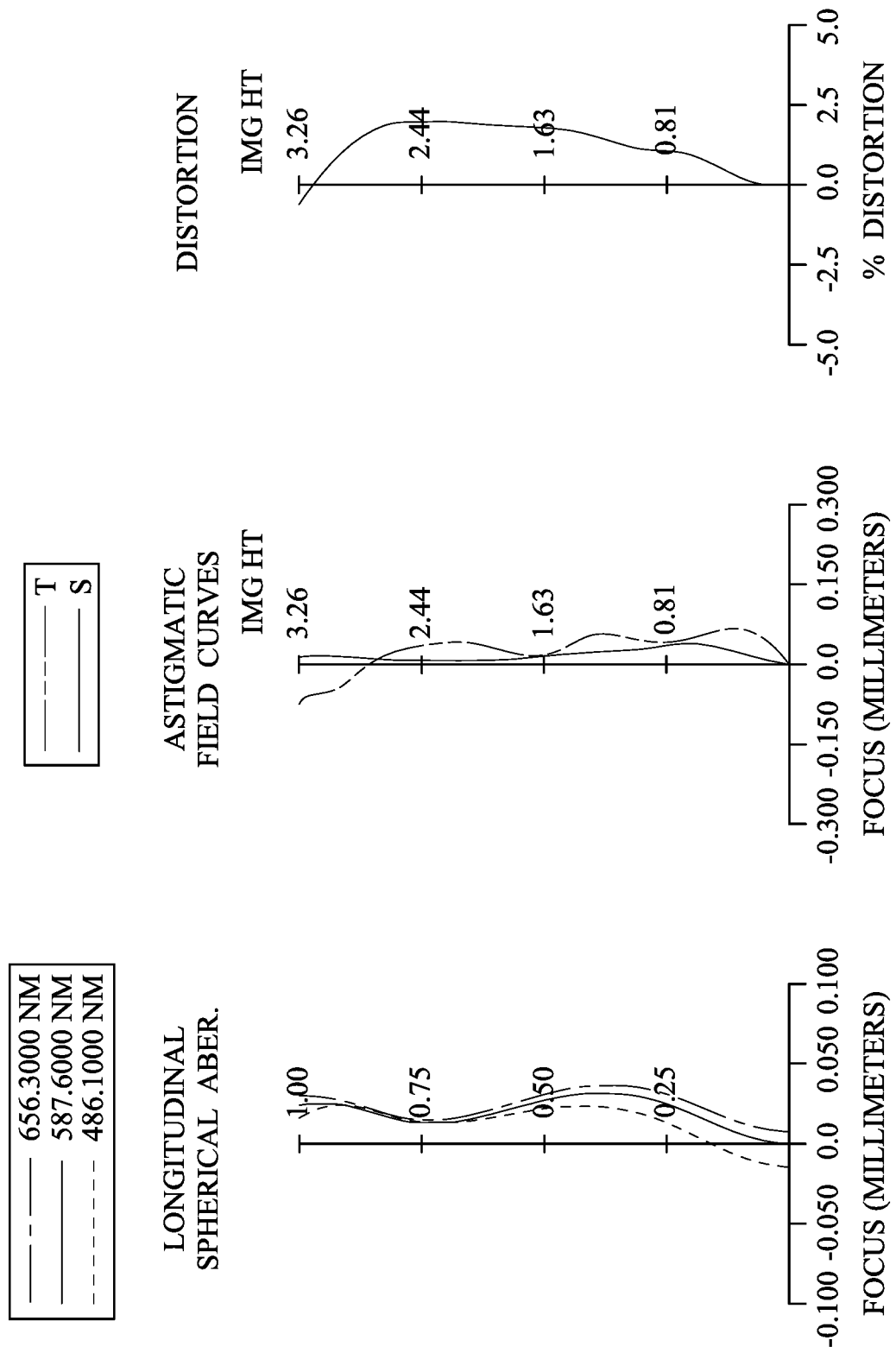
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows spherical aberration curves, astigmatic field curves and a distortion curve of the image capturing apparatus according to the 4th embodiment. In FIG. 7, the image capturing apparatus includes a photographing optical lens system (its reference numeral is omitted) and an image sensor 490. The photographing optical lens system includes, in order from an object side to an image side, a first lens element 410, an aperture stop 400, a second lens element 420, a stop 401, a third lens element 430, a fourth lens element 440, a fifth lens element 450, a sixth lens element 460, an IR-cut filter 470 and an image surface 480, wherein the image sensor 490 is disposed on the image surface 480 of the photographing optical lens system. The photographing optical lens system includes six lens elements (410, 420, 430, 440, 450, and 460) without additional one or more lens elements inserted between the first lens element 410 and the sixth lens element 460.

The first lens element 410 with positive refractive power has an object-side surface 411 being convex in a paraxial region thereof and an image-side surface 412 being convex in a paraxial region thereof. The first lens element 410 is made of a plastic material, and has the object-side surface 411 and the image-side surface 412 being both aspheric. Furthermore, the object-side surface 411 of the first lens element 410 includes at least one concave critical point in an off-axial region thereof.

The second lens element 420 with positive refractive power has an object-side surface 421 being concave in a paraxial region thereof and an image-side surface 422 being convex in a paraxial region thereof. The second lens element 420 is made of a plastic material, and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric. Furthermore, the image-side surface 432 of the third lens element 430 includes at least one convex critical point in an off-axial region thereof.

The fourth lens element 440 with negative refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with positive refractive power has an object-side surface 451 being convex in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex critical point in an off-axial region thereof.

The IR-cut filter 470 is made of a glass material and located between the sixth lens element 460 and the image surface 480, and will not affect the focal length of the photographing optical lens system.

The detailed optical data of the 4th embodiment are shown in Table 7 and the aspheric surface data are shown in Table 8 below.

TABLE 7

4th Embodiment
f = 2.74 mm, Fno = 1.86, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.272 | ASP | 0.273 | Plastic | 1.545 | 56.0 | 5.95 |
| 2 | | −8.271 | ASP | −0.065 | | | | |
| 3 | Ape. Stop | Plano | | 0.185 | | | | |
| 4 | Lens 2 | −3.926 | ASP | 0.497 | Plastic | 1.544 | 55.9 | 5.73 |
| 5 | | −1.814 | ASP | −0.234 | | | | |
| 6 | Stop | Plano | | 0.264 | | | | |
| 7 | Lens 3 | 1.686 | ASP | 0.240 | Plastic | 1.660 | 20.4 | −22.09 |
| 8 | | 1.426 | ASP | 0.472 | | | | |
| 9 | Lens 4 | −1.107 | ASP | 0.281 | Plastic | 1.639 | 23.5 | −3.93 |
| 10 | | −2.176 | ASP | 0.030 | | | | |
| 11 | Lens 5 | 11.003 | ASP | 0.756 | Plastic | 1.544 | 55.9 | 1.10 |
| 12 | | −0.616 | ASP | 0.030 | | | | |
| 13 | Lens 6 | 5.635 | ASP | 0.352 | Plastic | 1.544 | 55.9 | −1.27 |
| 14 | | 0.600 | ASP | 0.800 | | | | |
| 15 | IR-cut filter | Plano | | 0.210 | Glass | 1.517 | 64.2 | — |
| 16 | | Plano | | 0.313 | | | | |
| 17 | Image | Plano | | — | | | | |

Reference wavelength is 587.6 nm (d-line).
Effective radius of Stop on Surface 6 is 0.900 mm.

TABLE 8

Aspheric Coefficients

| Surface # | 1 | 2 | 4 | 5 | 7 | 8 |
|---|---|---|---|---|---|---|
| k = | 1.3035E+01 | 1.2036E+01 | −1.5203E+00 | 1.1437E+00 | −2.0327E+01 | −3.9507E+00 |
| A4 = | −1.6299E−01 | −9.0345E−02 | 1.7314E−01 | −2.2677E−02 | 2.0222E−01 | 1.2662E−02 |
| A6 = | −1.8868E−01 | −2.3245E−01 | −5.1565E−01 | −1.5330E−01 | −1.5626E+00 | −5.0898E−01 |
| A8 = | 2.6922E−01 | 1.0117E−01 | 9.4592E−01 | 2.8626E−01 | 3.2310E+00 | 9.4591E−01 |
| A10 = | −7.2246E−01 | 1.8073E−01 | −2.3226E+00 | 7.6622E−01 | −4.7485E+00 | −1.0321E+00 |
| A12 = | 8.8593E−01 | −1.6088E−01 | 4.0650E+00 | −2.3342E+00 | 4.0731E+00 | 7.3033E−01 |
| A14 = | −3.0794E−01 | 9.6032E−02 | −3.9842E+00 | 2.7021E+00 | −1.5538E+00 | −3.0980E−01 |
| A16 = | | | 1.3023E+00 | −1.1989E+00 | 1.3436E−01 | 5.4519E−02 |

| Surface # | 9 | 10 | 11 | 12 | 13 | 14 |
|---|---|---|---|---|---|---|
| k = | −5.8370E+00 | −6.7441E+01 | 1.3509E+01 | −3.6971E+00 | −6.9630E+00 | −5.3743E+00 |
| A4 = | 4.8853E−02 | −2.8019E−01 | −2.1861E−01 | −1.0833E−01 | −3.9857E−02 | −5.6991E−02 |
| A6 = | −5.1060E−01 | 7.0754E−01 | 4.9920E−01 | −8.1761E−03 | −3.4151E−02 | 1.1169E−02 |
| A8 = | 1.1856E+00 | −1.5437E+00 | −6.1811E−01 | 2.8129E−01 | 2.2000E−02 | −8.7704E−04 |
| A10 = | −9.2961E−01 | 1.8989E+00 | 4.7291E−01 | −2.4877E−01 | −6.5279E−03 | −4.5389E−04 |
| A12 = | 2.0304E−01 | −1.3575E+00 | −2.1782E−01 | 9.3772E−02 | 1.3288E−03 | 1.7650E−04 |
| A14 = | 7.6361E−02 | 5.4144E−01 | 5.3899E−02 | −1.6931E−02 | −1.6635E−04 | −2.6313E−05 |
| A16 = | −3.1804E−02 | −9.0199E−02 | −5.5165E−03 | 1.2022E−03 | 8.8899E−06 | 1.4313E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.74 | (R5 + R6)/f | 1.14 |
| Fno | 1.86 | (|R6| + |R7|)/f | 0.92 |
| HFOV [deg.] | 50.0 | f4/|f3| | −0.18 |
| (V3 + V4)/V5 | 0.79 | (f5/f1) + (f5/f2) | 0.38 |
| T56/T34 | 0.06 | (f/f5) + |f/f6| | 4.65 |
| ΣAT/T34 | 1.44 | f/R11 | 0.49 |
| (R3 + R4)/(R3 − R4) | 2.72 | f/SD62 | 1.09 |

Furthermore, in the photographing optical lens system according to the 4th embodiment, the focal length of the first lens element 410 is f1, the focal length of the second lens element 420 is f2, the focal length of the third lens element 430 is f3, the focal length of the fourth lens element 440 is f4, the focal length of the fifth lens element 450 is f5, the focal length of the sixth lens element 460 is f6, and a focal length of the x-th lens element is fx, the following conditions are satisfied: |f5|<|fx|; and |f6|<|fx|, wherein x=1, 2, 3, 4.

5th Embodiment

Figure 9:
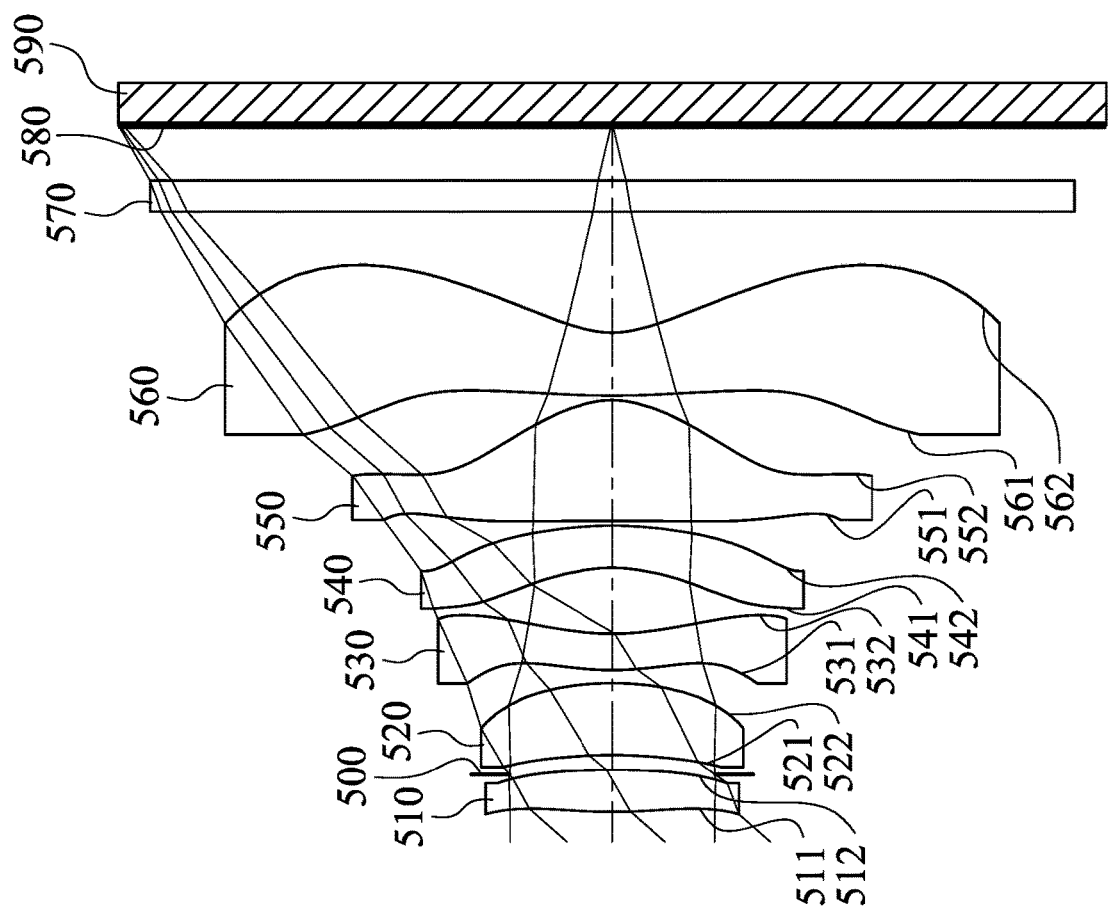
FIG. 9 is a schematic view of an image capturing apparatus according to the 5th embodiment of the present disclosure.
Figure 10:
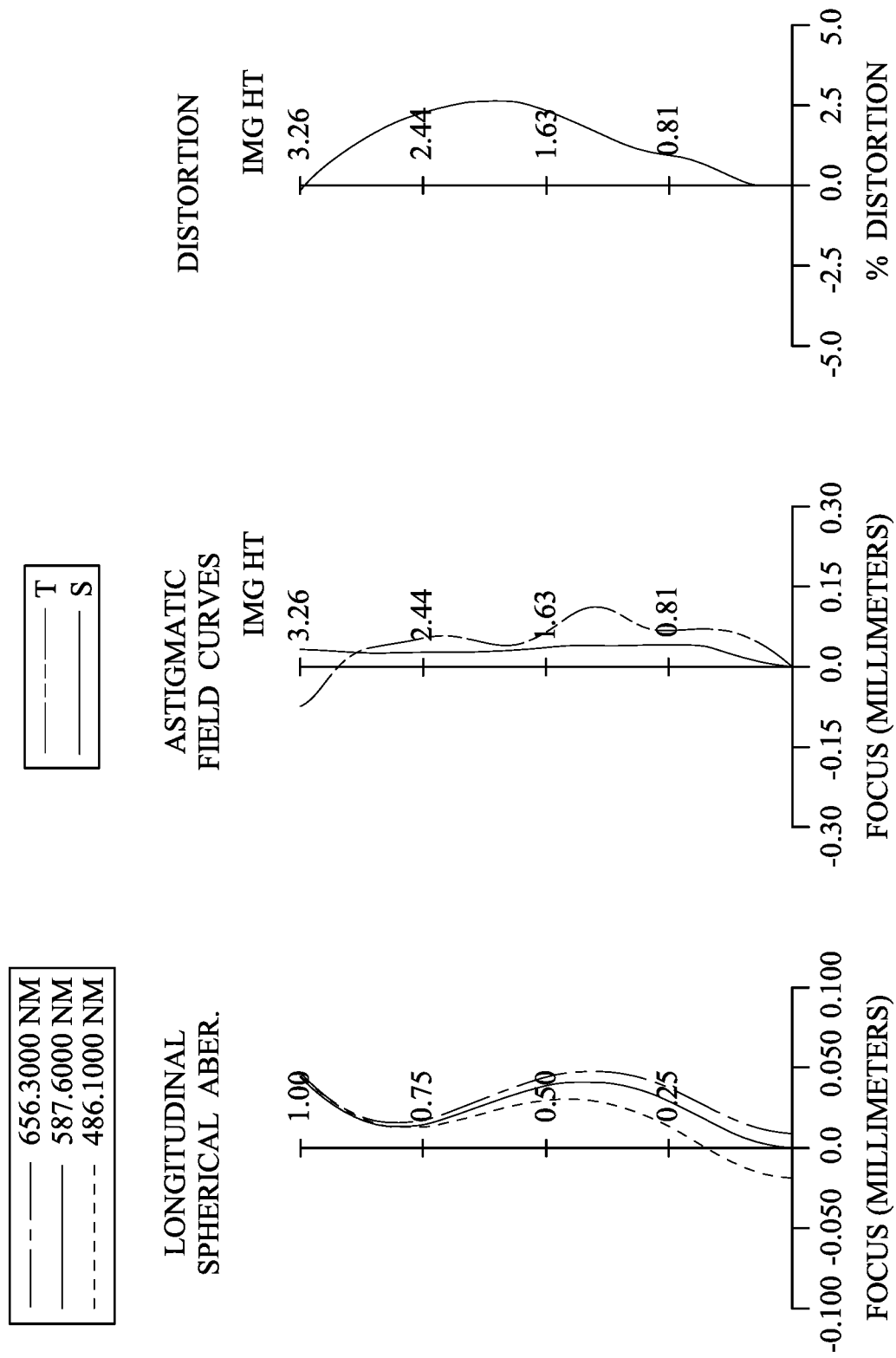
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows spherical aberration curves, astigmatic field curves and a distortion curve of the image capturing apparatus according to the 5th embodiment. In FIG. 9, the image capturing apparatus includes a photographing optical lens system (its reference numeral is omitted) and an image sensor 590. The photographing optical lens system includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580, wherein the image sensor 590 is disposed on the image surface 580 of the photographing optical lens system. The photographing optical lens system includes six lens elements (510, 520, 530, 540, 550, and 560) without additional one or more lens elements inserted between the first lens element 510 and the sixth lens element 560.

The first lens element 510 with positive refractive power has an object-side surface 511 being convex in a paraxial region thereof and an image-side surface 512 being convex in a paraxial region thereof. The first lens element 510 is made of a plastic material, and has the object-side surface 511 and the image-side surface 512 being both aspheric. Furthermore, the object-side surface 511 of the first lens element 510 includes at least one concave critical point in an off-axial region thereof.

The second lens element 520 with positive refractive power has an object-side surface 521 being concave in a paraxial region thereof and an image-side surface 522 being convex in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric. Furthermore, the image-side surface 532 of the third lens element 530 includes at least one convex critical point in an off-axial region thereof.

The fourth lens element 540 with negative refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex critical point in an off-axial region thereof.

The IR-cut filter 570 is made of a glass material and located between the sixth lens element 560 and the image surface 580, and will not affect the focal length of the photographing optical lens system.

The detailed optical data of the 5th embodiment are shown in Table 9 and the aspheric surface data are shown in Table 10 below.

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.87 | (R5 + R6)/f | 1.38 |
| Fno | 2.12 | (\|R6\| + \|R7\|)/f | 1.07 |
| HFOV [deg.] | 48.5 | f4/\|f3\| | −0.01 |
| (V3 + V4)/V5 | 0.78 | (f5/f1) + (f5/f2) | 0.35 |

TABLE 9

5th Embodiment
f = 2.87 mm, Fno = 2.12, HFOV= 48.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.265 | ASP | 0.279 | Plastic | 1.545 | 56.1 | 4.58 |
| 2 | | −5.892 | ASP | −0.031 | | | | |
| 3 | Ape. Stop | Plano | | 0.131 | | | | |
| 4 | Lens 2 | −3.035 | ASP | 0.475 | Plastic | 1.534 | 55.9 | 12.83 |
| 5 | | −2.217 | ASP | 0.087 | | | | |
| 6 | Lens 3 | 2.023 | ASP | 0.240 | Plastic | 1.660 | 20.4 | 288.98 |
| 7 | | 1.948 | ASP | 0.436 | | | | |
| 8 | Lens 4 | −1.133 | ASP | 0.280 | Plastic | 1.639 | 23.5 | −3.85 |
| 9 | | −2.302 | ASP | 0.030 | | | | |
| 10 | Lens 5 | 29.502 | ASP | 0.803 | Plastic | 1.544 | 56.0 | 1.17 |
| 11 | | −0.644 | ASP | 0.030 | | | | |
| 12 | Lens 6 | 5.898 | ASP | 0.416 | Plastic | 1.544 | 56.0 | −1.35 |
| 13 | | 0.638 | ASP | 0.800 | | | | |
| 14 | IR-cut filter | Plano | | 0.210 | Glass | 1.517 | 64.2 | — |
| 15 | | Plano | | 0.367 | | | | |
| 16 | Image | Plano | | — | | | | |

Reference wavelength is 587.6 nm (d-line).

TABLE 10

| Aspheric Coefficients | | | | | | |
|---|---|---|---|---|---|---|
| Surface # | 1 | 2 | 4 | 5 | 6 | 7 |
| k = | 1.0120E+01 | −1.3224E+01 | 4.0432E+00 | 2.8343E+00 | −3.5693E+01 | −2.7423E+00 |
| A4 = | −1.3549E−01 | −9.3553E−02 | 1.4308E−01 | −1.1791E−01 | 1.9245E−01 | 9.0772E−03 |
| A6 = | −2.0888E−01 | −1.5356E−01 | −3.7120E−01 | −5.9273E−02 | −1.5582E+00 | −5.1552E−01 |
| A8 = | 2.7495E−01 | 1.3343E−01 | 1.0242E+00 | 3.8538E−03 | 3.2334E+00 | 9.5003E−01 |
| A10 = | −6.9544E−01 | 1.2684E−01 | −2.5298E+00 | 7.5575E−01 | −4.7826E+00 | −1.0290E+00 |
| A12 = | 9.3635E−01 | −2.7702E−01 | 4.0324E+00 | −2.3680E+00 | 4.0604E+00 | 7.3192E−01 |
| A14 = | −3.7269E−01 | 2.4875E−01 | −4.1285E+00 | 2.6984E+00 | −1.5523E+00 | −3.1044E−01 |
| A16 = | | | 1.5389E+00 | −1.2055E+00 | 1.7002E−01 | 5.4741E−02 |
| Surface # | 8 | 9 | 10 | 11 | 12 | 13 |
| k = | −5.3274E+00 | −6.2280E+01 | 9.0000E+01 | −3.4807E+00 | −6.9627E+00 | −5.3122E+00 |
| A4 = | 3.5841E−02 | −2.5920E−01 | −1.7819E−01 | −1.2153E−01 | −5.9481E−02 | −4.5386E−02 |
| A6 = | −5.1164E−01 | 7.0873E−01 | 4.9242E−01 | −1.4654E−03 | 4.1086E−02 | 1.4551E−02 |
| A8 = | 1.1875E+00 | −1.5487E+00 | −6.2226E−01 | 2.8307E−01 | −4.6140E−02 | −5.8218E−03 |
| A10 = | −9.2783E−01 | 1.8943E+00 | 4.7364E−01 | −2.4938E−01 | 2.1967E−02 | 1.4837E−03 |
| A12 = | 2.0612E−01 | −1.3584E+00 | −2.1704E−01 | 9.3518E−02 | −4.8921E−03 | −2.1697E−04 |
| A14 = | 7.6780E−02 | 5.4158E−01 | 5.4113E−02 | −1.6877E−02 | 5.2188E−04 | 1.6256E−05 |
| A16 = | −3.4204E−02 | −9.0173E−02 | −5.6893E−03 | 1.2050E−03 | −2.1617E−05 | −4.7676E−07 |

-continued

| 5th Embodiment | | | |
|---|---|---|---|
| T56/T34 | 0.07 | (f/f5) + \|f/f6\| | 4.58 |
| ΣAT/T34 | 1.57 | f/R11 | 0.49 |
| (R3 + R4)/(R3 − R4) | 6.43 | f/SD62 | 1.12 |

Furthermore, in the photographing optical lens system according to the 5th embodiment, the focal length of the first lens element 510 is f1, the focal length of the second lens element 520 is f2, the focal length of the third lens element 530 is f3, the focal length of the fourth lens element 540 is f4, the focal length of the fifth lens element 550 is f5, the focal length of the sixth lens element 560 is f6, and a focal length of the x-th lens element is fx, the following conditions are satisfied: $|f5|<|fx|$; and $|f6|<|fx|$, wherein x=1, 2, 3, 4.

6th Embodiment

Figure 11:
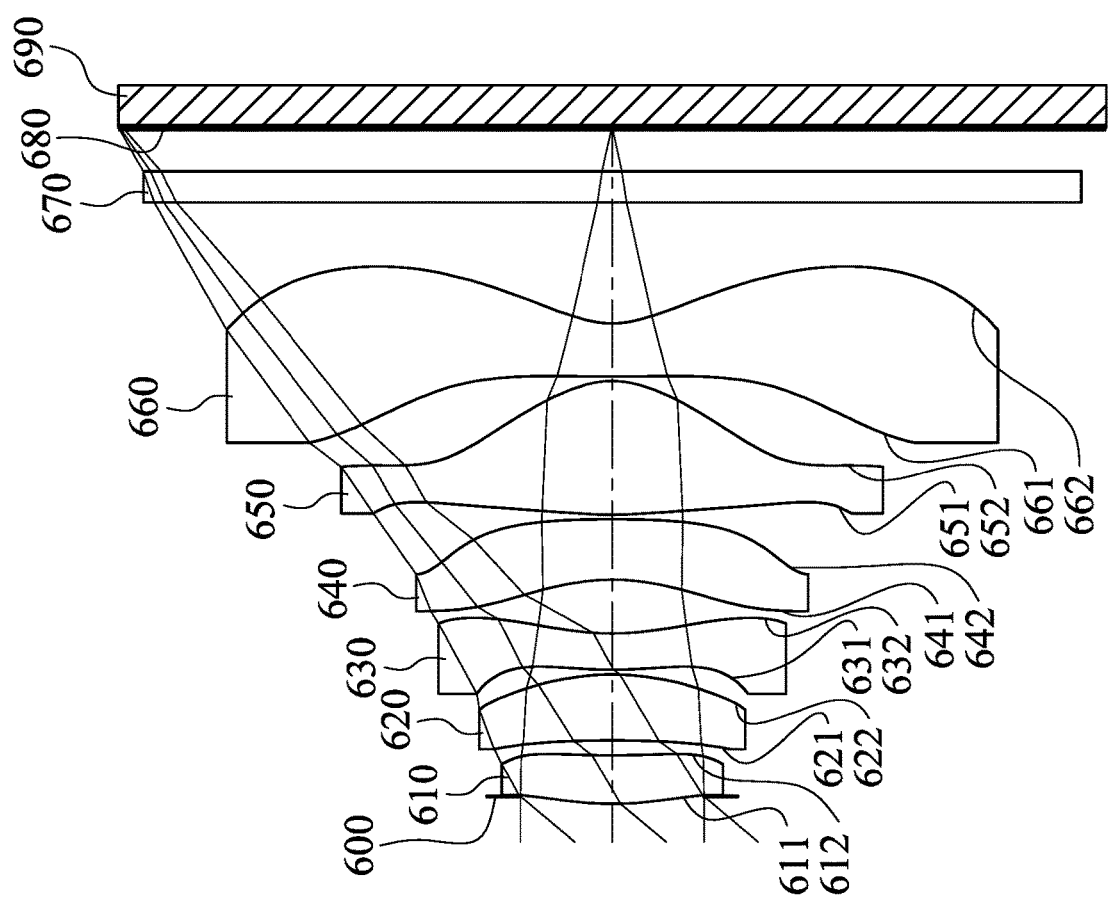
FIG. 11 is a schematic view of an image capturing apparatus according to the 6th embodiment of the present disclosure.
Figure 12:
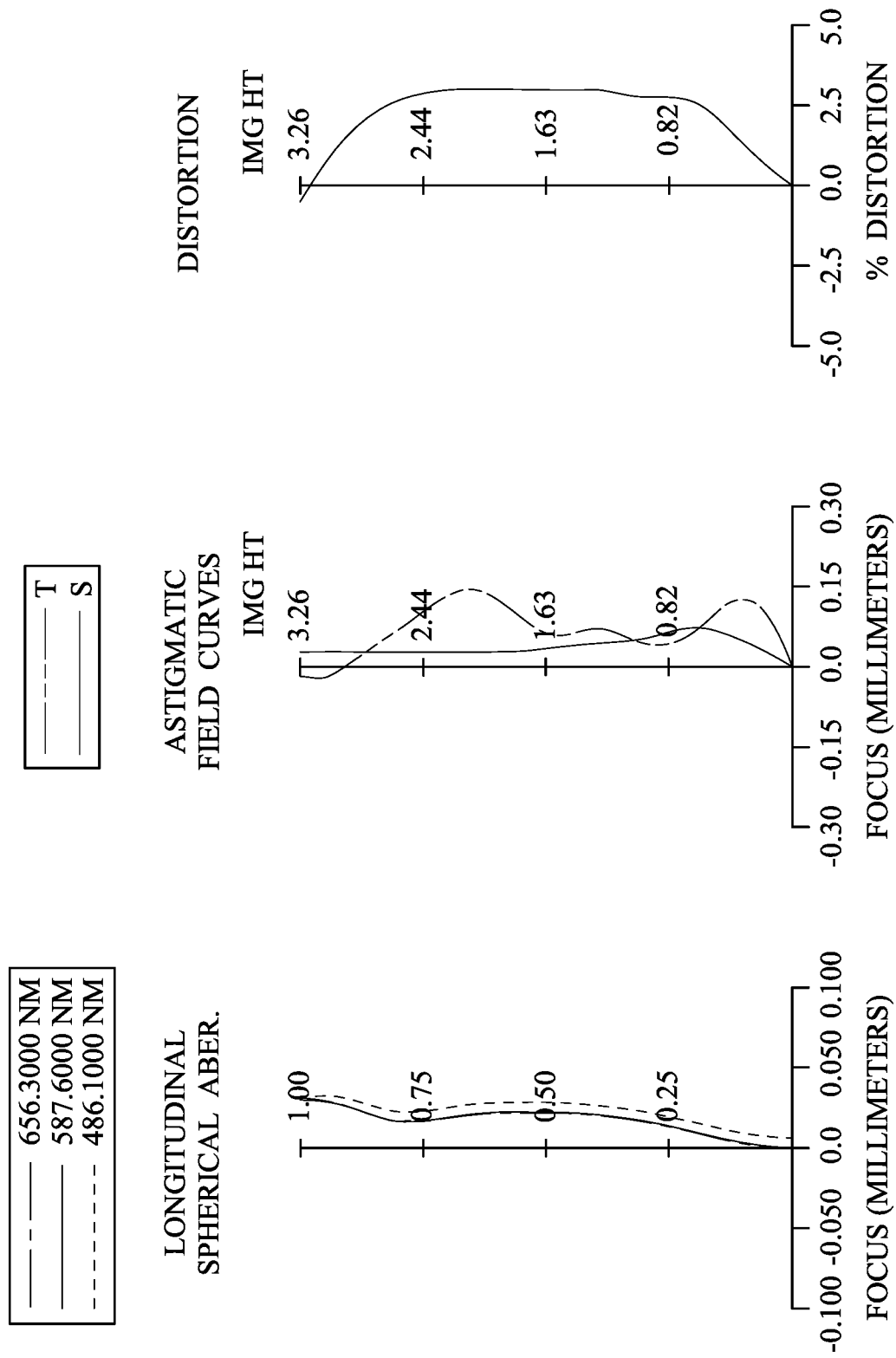
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows spherical aberration curves, astigmatic field curves and a distortion curve of the image capturing apparatus according to the 6th embodiment. In FIG. 11, the image capturing apparatus includes a photographing optical lens system (its reference numeral is omitted) and an image sensor 690. The photographing optical lens system includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680, wherein the image sensor 690 is disposed on the image surface 680 of the photographing optical lens system. The photographing optical lens system includes six lens elements (610, 620, 630, 640, 650, and 660) without additional one or more lens elements inserted between the first lens element 610 and the sixth lens element 660.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of a plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric. Furthermore, the image-side surface 632 of the third lens element 630 includes at least one convex critical point in an off-axial region thereof.

The fourth lens element 640 with negative refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex critical point in an off-axial region thereof.

The IR-cut filter 670 is made of a glass material and located between the sixth lens element 660 and the image surface 680, and will not affect the focal length of the photographing optical lens system.

The detailed optical data of the 6th embodiment are shown in Table 11 and the aspheric surface data are shown in Table 12 below.

TABLE 11

6th Embodiment
f = 2.74 mm, Fno = 2.25, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.048 | | | | |
| 2 | Lens 1 | 2.326 | ASP | 0.324 | Plastic | 1.559 | 40.4 | 6.41 |
| 3 | | 6.312 | ASP | 0.100 | | | | |
| 4 | Lens 2 | −6.095 | ASP | 0.436 | Plastic | 1.544 | 56.0 | 3.98 |
| 5 | | −1.639 | ASP | 0.030 | | | | |
| 6 | Lens 3 | 2.993 | ASP | 0.240 | Plastic | 1.671 | 19.5 | −6.93 |
| 7 | | 1.762 | ASP | 0.357 | | | | |
| 8 | Lens 4 | −1.385 | ASP | 0.398 | Plastic | 1.584 | 28.2 | −2.69 |
| 9 | | −12.806 | ASP | 0.030 | | | | |
| 10 | Lens 5 | 2.262 | ASP | 0.890 | Plastic | 1.544 | 56.0 | 0.98 |
| 11 | | −0.599 | ASP | 0.030 | | | | |
| 12 | Lens 6 | 14.370 | ASP | 0.350 | Plastic | 1.559 | 40.4 | −1.14 |
| 13 | | 0.604 | ASP | 0.800 | | | | |

TABLE 11-continued

6th Embodiment
f = 2.74 mm, Fno = 2.25, HFOV = 50.0 deg.

| Surface # | | Curvature Radius | Thickness | Material | Index | Abbe # | Focal Length |
|---|---|---|---|---|---|---|---|
| 14 | IR-cut filter | Plano | 0.210 | Glass | 1.517 | 64.2 | — |
| 15 | | Plano | 0.289 | | | | |
| 16 | Image | Plano | — | | | | |

Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | 9.2769E+00 | −1.1474E+00 | −2.0960E+01 | −1.5429E+00 | −7.6610E+01 | −1.3904E+01 |
| A4 = | −1.4584E−01 | −8.5980E−02 | 1.2983E−01 | 7.4582E−02 | 5.5174E−02 | 4.7413E−02 |
| A6 = | −5.2796E−01 | −3.2092E−01 | −3.6262E−01 | −1.9666E−01 | −1.3726E+00 | −4.8618E−01 |
| A8 = | 6.4427E−01 | −6.9457E−01 | 4.5894E−01 | 1.0092E−01 | 3.1317E+00 | 9.2749E−01 |
| A10 = | −9.6969E−01 | 4.6210E−01 | −2.8415E+00 | 9.3734E−01 | −4.8551E+00 | −1.0499E+00 |
| A12 = | −2.0668E+00 | 4.1750E−01 | 4.8672E+00 | −2.3539E+00 | 4.0521E+00 | 7.3512E−01 |
| A14 = | 1.1443E+00 | 1.0412E−01 | 1.7959E−01 | 2.2692E+00 | −1.6015E+00 | −2.9942E−01 |
| A16 = | | | −3.0418E+00 | −9.9686E−01 | 1.4578E−01 | 5.2467E−02 |

| Surface # | 8 | 9 | 10 | 11 | 12 | 13 |
|---|---|---|---|---|---|---|
| k = | −5.6464E+00 | 8.3777E+01 | −8.9995E+01 | −3.6289E+00 | −6.8727E+00 | −5.2264E+00 |
| A4 = | 1.1826E−01 | −2.6741E−01 | −9.7092E−02 | −1.4285E−01 | −1.1134E−01 | −8.3325E−02 |
| A6 = | −5.5031E−01 | 7.0317E−01 | 1.8932E−01 | 2.9742E−02 | 4.0244E−02 | 2.7389E−02 |
| A8 = | 1.1563E+00 | −1.5574E+00 | −1.8677E−01 | 1.8762E−01 | −2.5450E−02 | −5.6426E−03 |
| A10 = | −9.2846E−01 | 1.8890E+00 | 1.0657E−01 | −1.5501E−01 | 1.4200E−02 | 4.8561E−04 |
| A12 = | 2.1688E−01 | −1.3597E+00 | −3.4047E−02 | 5.2001E−02 | −4.1124E−03 | 3.2930E−05 |
| A14 = | 8.1177E−02 | 5.4207E−01 | 4.8237E−03 | −8.2142E−03 | 5.9152E−04 | −1.0566E−05 |
| A16 = | −3.6558E−02 | −8.8641E−02 | −1.5094E−04 | 5.0452E−04 | −3.4169E−05 | 6.2438E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.74 | (R5 + R6)/f | 1.74 |
| Fno | 2.25 | (|R6| + |R7|)/f | 1.15 |
| HFOV [deg.] | 50.0 | f4/|f3| | −0.39 |
| (V3 + V4)/V5 | 0.85 | (f5/f1) + (f5/f2) | 0.40 |
| T56/T34 | 0.08 | (f/f5) + |f/f6| | 5.20 |
| ΣAT/T34 | 1.53 | f/R11 | 0.19 |
| (R3 + R4)/(R3 − R4) | 1.74 | f/SD62 | 1.07 |

Furthermore, in the photographing optical lens system according to the 6th embodiment, when the focal length of the first lens element 610 is f1, the focal length of the second lens element 620 is f2, the focal length of the third lens element 630 is f3, the focal length of the fourth lens element 640 is f4, the focal length of the fifth lens element 650 is f5, the focal length of the sixth lens element 660 is f6, and a focal length of the x-th lens element is fx, the following conditions are satisfied: |f5|<|fx|; and |f6|<|fx|, wherein x=1, 2, 3, 4.

7th Embodiment

Figure 13:
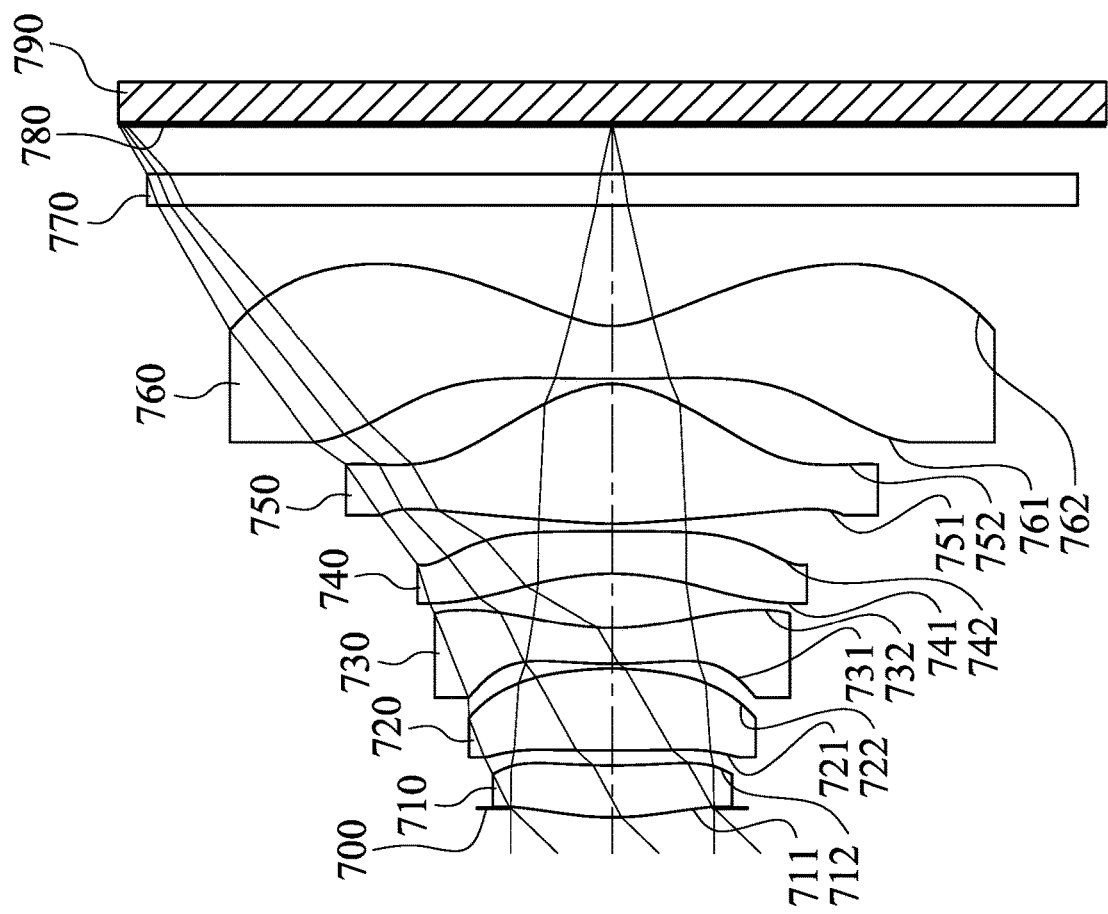
FIG. 13 is a schematic view of an image capturing apparatus according to the 7th embodiment of the present disclosure.
Figure 14:
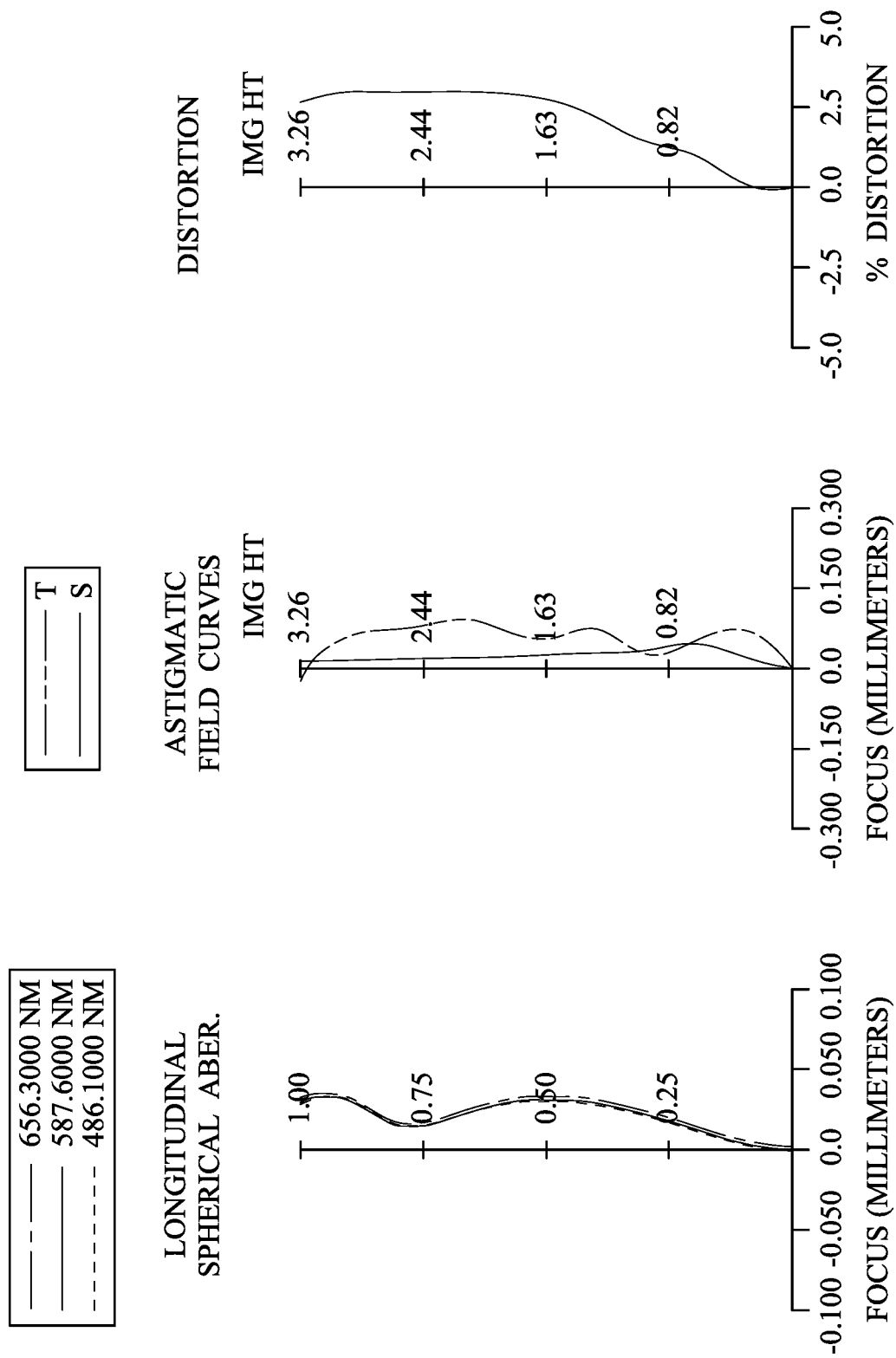
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows spherical aberration curves, astigmatic field curves and a distortion curve of the image capturing apparatus according to the 7th embodiment. In FIG. 13, the image capturing apparatus includes a photographing optical lens system (its reference numeral is omitted) and an image sensor 790. The photographing optical lens system includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the image sensor 790 is disposed on the image surface 780 of the photographing optical lens system. The photographing optical lens system includes six lens elements (710, 720, 730, 740, 750, and 760) without additional one or more lens elements inserted between the first lens element 710 and the sixth lens element 760.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of a plastic material, and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric. Furthermore, the image-side surface 732 of the third lens element 730 includes at least one convex critical point in an off-axial region thereof.

The fourth lens element 740 with negative refractive power has an object-side surface 741 being concave in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with positive refractive power has an object-side surface 751 being convex in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex critical point in an off-axial region thereof.

The IR-cut filter 770 is made of a glass material and located between the sixth lens element 760 and the image surface 780, and will not affect the focal length of the photographing optical lens system.

The detailed optical data of the 7th embodiment are shown in Table 13 and the aspheric surface data are shown in Table 14 below.

TABLE 13

7th Embodiment
f = 3.04 mm, Fno = 2.25, HFOV = 46.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.061 | | | | |
| 2 | Lens 1 | 2.278 | ASP | 0.344 | Plastic | 1.545 | 56.1 | 7.10 |
| 3 | | 5.245 | ASP | 0.100 | | | | |
| 4 | Lens 2 | 101.904 | ASP | 0.544 | Plastic | 1.545 | 56.1 | 3.81 |
| 5 | | −2.115 | ASP | 0.030 | | | | |
| 6 | Lens 3 | 3.211 | ASP | 0.240 | Plastic | 1.614 | 25.6 | −6.73 |
| 7 | | 1.756 | ASP | 0.364 | | | | |
| 8 | Lens 4 | −1.639 | ASP | 0.280 | Plastic | 1.584 | 28.2 | −2.61 |
| 9 | | 22.828 | ASP | 0.052 | | | | |
| 10 | Lens 5 | 2.370 | ASP | 0.927 | Plastic | 1.545 | 56.1 | 0.99 |
| 11 | | −0.605 | ASP | 0.034 | | | | |
| 12 | Lens 6 | 13.828 | ASP | 0.356 | Plastic | 1.545 | 56.1 | −1.11 |
| 13 | | 0.574 | ASP | 0.800 | | | | |
| 14 | IR-cut filter | Plano | | 0.210 | Glass | 1.517 | 64.2 | — |
| 15 | | Plano | | 0.328 | | | | |
| 16 | Image | Plano | | — | | | | |

Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | 7.2241E+00 | 2.0999E+01 | 9.0000E+01 | −1.2504E+00 | −9.0000E+01 | −9.4138E+00 |
| A4 = | −1.1706E−01 | −2.4989E−02 | 1.4018E−01 | 6.4091E−02 | 8.8693E−02 | 4.6931E−02 |
| A6 = | −3.6991E−01 | −3.9752E−02 | −3.9273E−01 | −2.9874E−01 | −1.4561E+00 | −4.8437E−01 |
| A8 = | 3.3429E−01 | −5.4505E−01 | 4.6233E−01 | −7.5879E−02 | 3.0922E+00 | 9.2595E−01 |
| A10 = | −5.2375E−01 | 3.8410E−01 | −3.0545E+00 | 9.4160E−01 | −4.8163E+00 | −1.0500E+00 |
| A12 = | −6.1512E−01 | 6.3356E−01 | 4.5854E+00 | −2.2802E+00 | 4.0679E+00 | 7.3587E−01 |
| A14 = | 1.9983E−01 | −2.3966E−01 | −7.9922E−02 | 2.4238E+00 | −1.5636E+00 | −2.9834E−01 |
| A16 = | | | −1.9321E+00 | −9.3649E−01 | 2.3882E−01 | 5.2793E−02 |

| Surface # | 8 | 9 | 10 | 11 | 12 | 13 |
|---|---|---|---|---|---|---|
| k = | −9.7767E+00 | 8.3862E+01 | −8.9995E+01 | −3.8521E+00 | −6.8727E+00 | −5.2264E+00 |
| A4 = | 8.3471E−02 | −2.9456E−01 | −1.1263E−01 | −1.1134E−01 | −4.7838E−02 | −5.3670E−02 |
| A6 = | −5.6388E−01 | 7.1601E−01 | 3.0204E−01 | 4.1855E−02 | −3.2319E−02 | 5.2634E−03 |
| A8 = | 1.1589E+00 | −1.5480E+00 | −3.9259E−01 | 1.1898E−01 | 1.3238E−02 | 2.6646E−03 |
| A10 = | −9.2372E−01 | 1.8914E+00 | 2.9758E−01 | −1.0257E−01 | −1.5986E−04 | −1.4834E−03 |
| A12 = | 2.1883E−01 | −1.3608E+00 | −1.3386E−01 | 3.4810E−02 | −2.8660E−04 | 3.2522E−04 |
| A14 = | 8.1311E−02 | 5.4084E−01 | 3.2821E−02 | −5.5880E−03 | −5.4332E−07 | −3.5011E−05 |
| A16 = | −3.7093E−02 | −8.8844E−02 | −3.4169E−03 | 3.5139E−04 | 3.4620E−06 | 1.4946E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.04 | (R5 + R6)/f | 1.63 |
| Fno | 2.25 | (|R6| + |R7|)/f | 1.12 |
| HFOV [deg.] | 46.1 | f4/|f3| | −0.39 |
| (V3 + V4)/V5 | 0.96 | (f5/f1) + (f5/f2) | 0.40 |
| T56/T34 | 0.09 | (f/f5) + |f/f6| | 5.81 |
| ΣAT/T34 | 1.59 | f/R11 | 0.22 |
| (R3 + R4)/(R3 − R4) | 0.96 | f/SD62 | 1.20 |

Furthermore, in the photographing optical lens system according to the 7th embodiment, when the focal length of the first lens element 710 is f1, the focal length of the second lens element 720 is f2, the focal length of the third lens element 730 is f3, the focal length of the fourth lens element 740 is f4, the focal length of the fifth lens element 750 is f5, the focal length of the sixth lens element 760 is f6, and a focal length of the x-th lens element is fx, the following to conditions are satisfied: |f5|<|fx|; and |f6|<|fx|, wherein x=1, 2, 3, 4.

8th Embodiment

Figure 15:
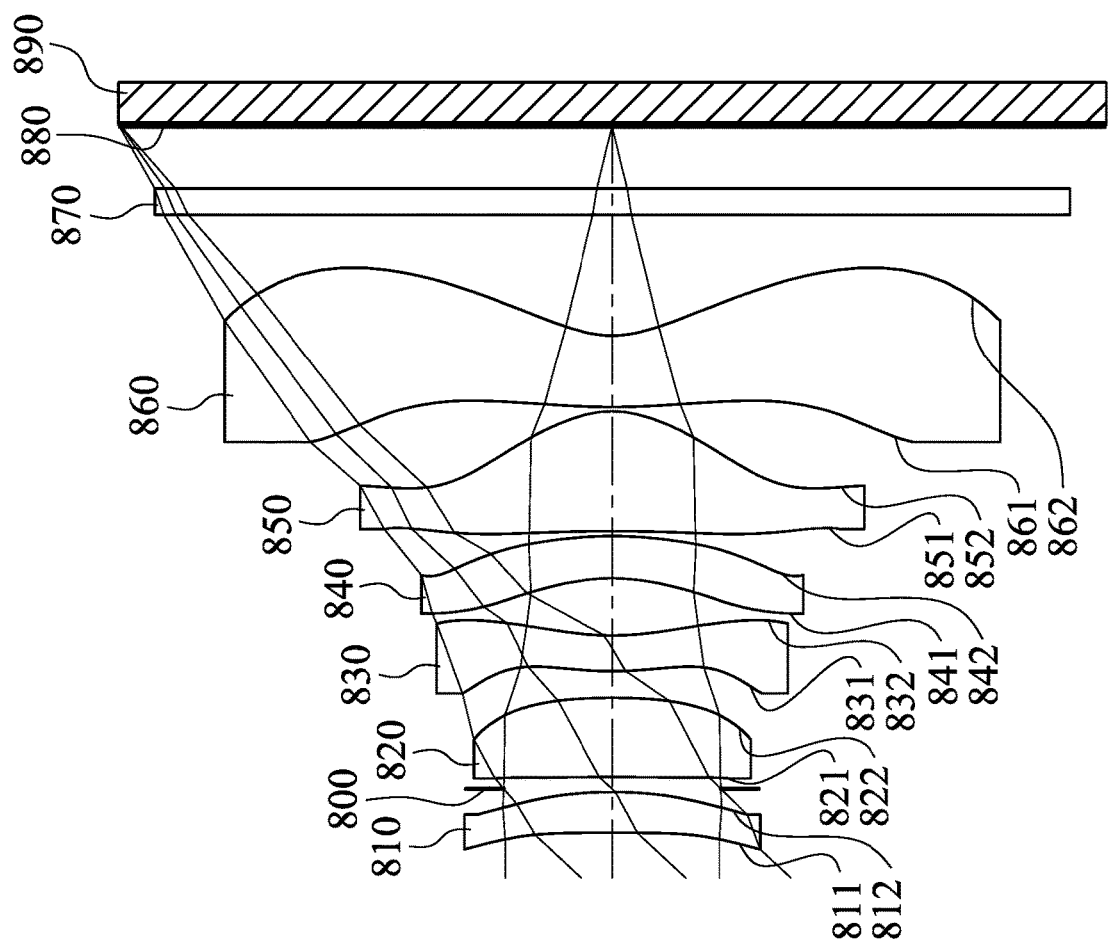
FIG. 15 is a schematic view of an image capturing apparatus according to the 8th embodiment of the present disclosure.
Figure 16:
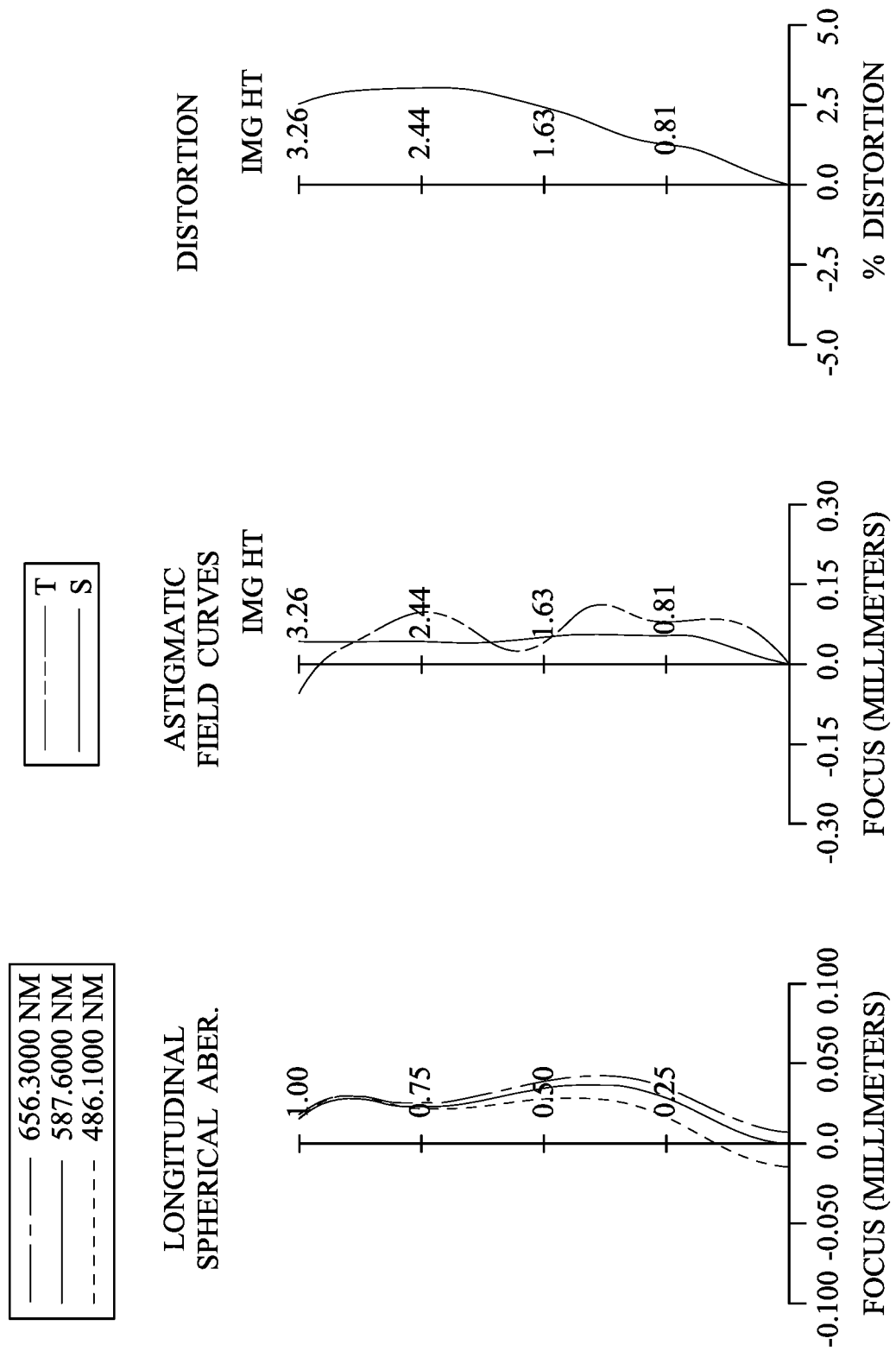
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows spherical aberration curves, astigmatic field curves and a distortion curve of the image capturing apparatus according to the 8th embodiment. In FIG. 15, the image capturing apparatus includes a photographing optical lens system (its reference numeral is omitted) and an image sensor 890. The photographing optical lens system includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880, wherein the image sensor 890 is disposed on the image surface 880 of the photographing optical lens system. The photographing optical lens system includes six lens elements (810, 820, 830, 840, 850, and 860) without additional one or more lens elements inserted between the first lens element 810 and the sixth lens element 860.

The first lens element 810 with positive refractive power has an object-side surface 811 being concave in a paraxial region thereof and an image-side surface 812 being convex in a paraxial region thereof. The first lens element 810 is made of a plastic material, and has the object-side surface 811 and the image-side surface 812 being both aspheric.

The second lens element 820 with positive refractive power has an object-side surface 821 being concave in a paraxial region thereof and an image-side surface 822 being convex in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric. Furthermore, the image-side surface 832 of the third lens element 830 includes at least one convex critical point in an off-axial region thereof.

The fourth lens element 840 with negative refractive power has an object-side surface 841 being concave in a paraxial region thereof and an image-side surface 842 being convex in a paraxial region thereof. The fourth lens element 840 is made of a plastic material, and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the image-side surface 862 of the sixth lens element 860 includes at least one convex critical point in an off-axial region thereof.

The IR-cut filter 870 is made of a glass material and located between the sixth lens element 860 and the image surface 880, and will not affect the focal length of the photographing optical lens system.

The detailed optical data of the 8th embodiment are shown in Table 15 and the aspheric surface data are shown in Table 16 below.

TABLE 15

8th Embodiment
f = 2.95 mm, Fno = 2.08, HFOV = 47.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −122.923 | ASP | 0.270 | Plastic | 1.545 | 56.0 | 4.94 |
| 2 | | −2.636 | ASP | 0.021 | | | | |
| 3 | Ape. Stop | Plano | | 0.079 | | | | |
| 4 | Lens 2 | −9.560 | ASP | 0.523 | Plastic | 1.544 | 55.9 | 12.96 |
| 5 | | −4.135 | ASP | 0.177 | | | | |
| 6 | Lens 3 | 2.315 | ASP | 0.240 | Plastic | 1.650 | 21.5 | −33.37 |

TABLE 15-continued

8th Embodiment
f = 2.95 mm, Fno = 2.08, HFOV = 47.0 deg.

| Surface # | | Curvature Radius | | Thickness | Material | Index | Abbe # | Focal Length |
|---|---|---|---|---|---|---|---|---|
| 7 | | 2.007 | ASP | 0.378 | | | | |
| 8 | Lens 4 | −1.390 | ASP | 0.280 | Plastic | 1.650 | 21.5 | −4.88 |
| 9 | | −2.669 | ASP | 0.030 | | | | |
| 10 | Lens 5 | −34.374 | ASP | 0.795 | Plastic | 1.544 | 55.9 | 1.28 |
| 11 | | −0.688 | ASP | 0.030 | | | | |
| 12 | Lens 6 | 4.832 | ASP | 0.474 | Plastic | 1.544 | 55.9 | −1.50 |
| 13 | | 0.675 | ASP | 0.800 | | | | |
| 14 | IR-cut filter | Plano | | 0.175 | Glass | 1.517 | 64.2 | — |
| 15 | | Plano | | 0.421 | | | | |
| 16 | Image | Plano | | — | | | | |

Reference wavelength is 587.6 nm (d-line).

TABLE 16

Aspheric Coefficients

| Surface # | 1 | 2 | 4 | 5 | 6 | 7 |
|---|---|---|---|---|---|---|
| k = | 9.0000E+01 | −4.8977E+00 | 7.3161E+01 | 8.7121E+00 | −5.6516E+01 | −6.1356E+00 |
| A4 = | −1.5397E−01 | −5.7278E−02 | 1.7361E−01 | −1.7487E−01 | 1.2530E−01 | −6.6742E−03 |
| A6 = | −1.6559E−01 | 1.2553E−02 | −2.4553E−01 | −5.8192E−02 | −1.5973E+00 | −4.8314E−01 |
| A8 = | 5.6988E−01 | 4.9779E−02 | 8.2249E−01 | −8.4121E−03 | 3.2717E+00 | 9.6437E−01 |
| A10 = | −7.2005E−01 | −2.0678E−02 | −2.6285E+00 | 7.8603E−01 | −4.6417E+00 | −1.0364E+00 |
| A12 = | 4.9544E−01 | −1.2628E−02 | 4.2749E+00 | −2.3542E+00 | 4.0116E+00 | 7.1180E−01 |
| A14 = | −1.3695E−01 | 3.4712E−02 | −3.8810E+00 | 2.5811E+00 | −1.6284E+00 | −3.1001E−01 |
| A16 = | | | 1.3784E+00 | −1.0489E+00 | 2.0761E−01 | 6.2861E−02 |

| Surface # | 8 | 9 | 10 | 11 | 12 | 13 |
|---|---|---|---|---|---|---|
| k = | −6.7306E+00 | −7.5340E+01 | 9.0000E+01 | −3.4779E+00 | −3.6875E+01 | −5.0530E+00 |
| A4 = | 4.5852E−02 | −2.8447E−01 | −1.7413E−01 | −1.3156E−01 | −4.3081E−02 | −5.1354E−02 |
| A6 = | −5.2451E−01 | 7.2273E−01 | 4.9341E−01 | −7.2956E−03 | 7.0393E−03 | 1.4059E−02 |
| A8 = | 1.1793E+00 | −1.5400E+00 | −6.2134E−01 | 2.8647E−01 | −4.8680E−03 | −2.7572E−03 |
| A10 = | −9.2583E−01 | 1.8989E+00 | 4.7350E−01 | −2.4884E−01 | 3.7028E−04 | 9.7921E−05 |
| A12 = | 2.0381E−01 | −1.3606E+00 | −2.1719E−01 | 9.3384E−02 | 6.2047E−04 | 5.7959E−05 |
| A14 = | 7.6958E−02 | 5.3986E−01 | 5.4248E−02 | −1.6934E−02 | −1.6123E−04 | −9.8159E−06 |
| A16 = | −3.2052E−02 | −8.9862E−02 | −5.6704E−03 | 1.2142E−03 | 1.1389E−05 | 4.8410E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.95 | (R5 + R6)/f | 1.47 |
| Fno | 2.08 | (|R6| + |R7|)/f | 1.15 |
| HFOV [deg.] | 47.0 | f4/|f3| | −0.15 |
| (V3 + V4)/V5 | 0.77 | (f5/f1) + (f5/f2) | 0.36 |
| T56/T34 | 0.08 | (f/f5) + |f/f6| | 4.27 |
| ΣAT/T34 | 1.89 | f/R11 | 0.61 |
| (R3 + R4)/(R3 − R4) | 2.52 | f/SD62 | 1.15 |

Furthermore, in the photographing optical lens system according to the 8th embodiment, when the focal length of the first lens element 810 is f1, the focal length of the second lens element 820 is f2, the focal length of the third lens element 830 is f3, the focal length of the fourth lens element 840 is f4, the focal length of the fifth lens element 850 is f5, the focal length of the sixth lens element 860 is f6, and a focal length of the x-th lens element is fx, the following conditions are satisfied: |f5|<|fx|; and |f6|<|fx|, wherein x=1, 2, 3, 4.

9th Embodiment

Figure 18A:
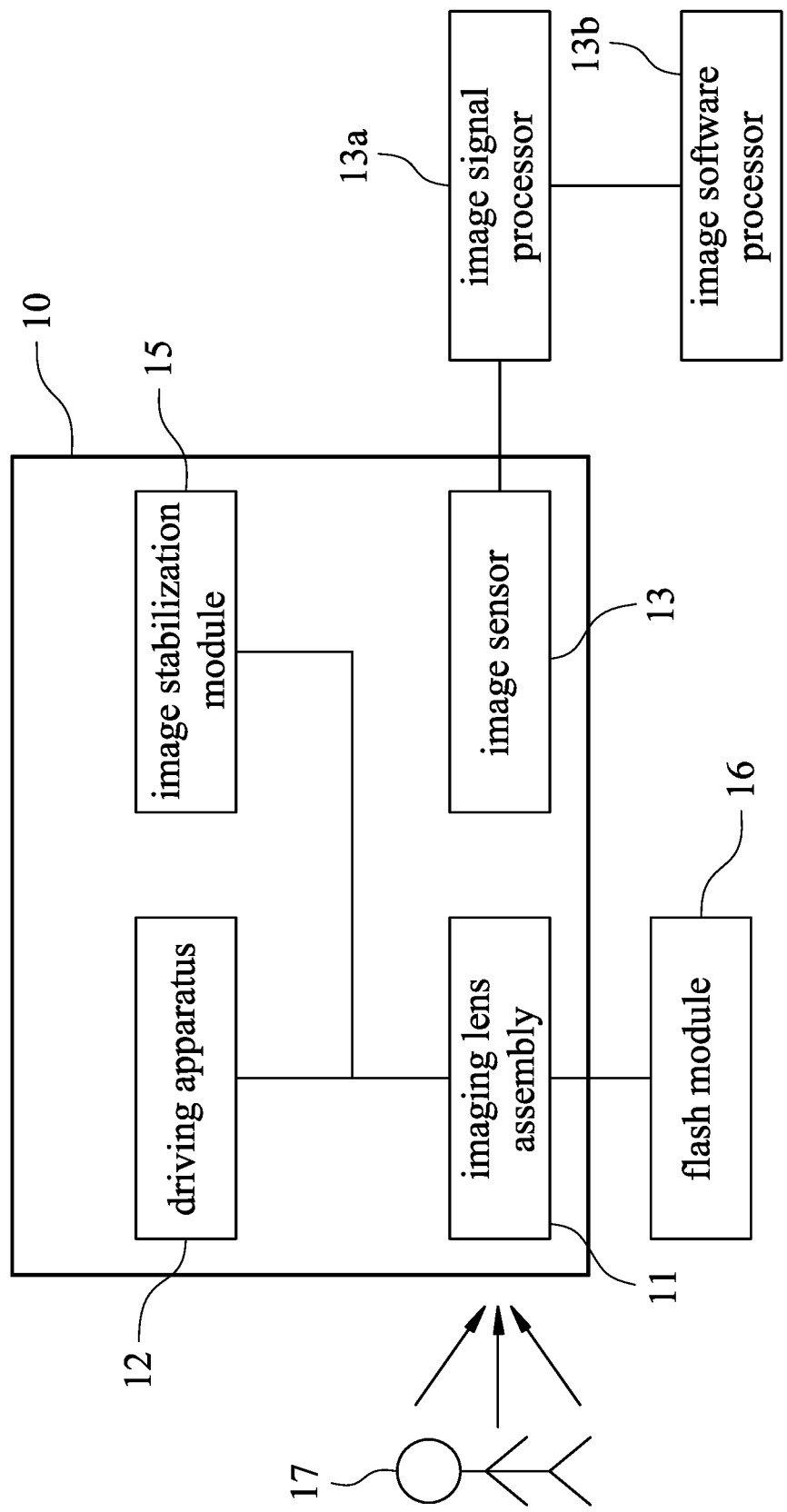
FIG. 18A is a system schematic view of an image capturing apparatus according to the 9th embodiment of the present disclosure.
Figure 18B:
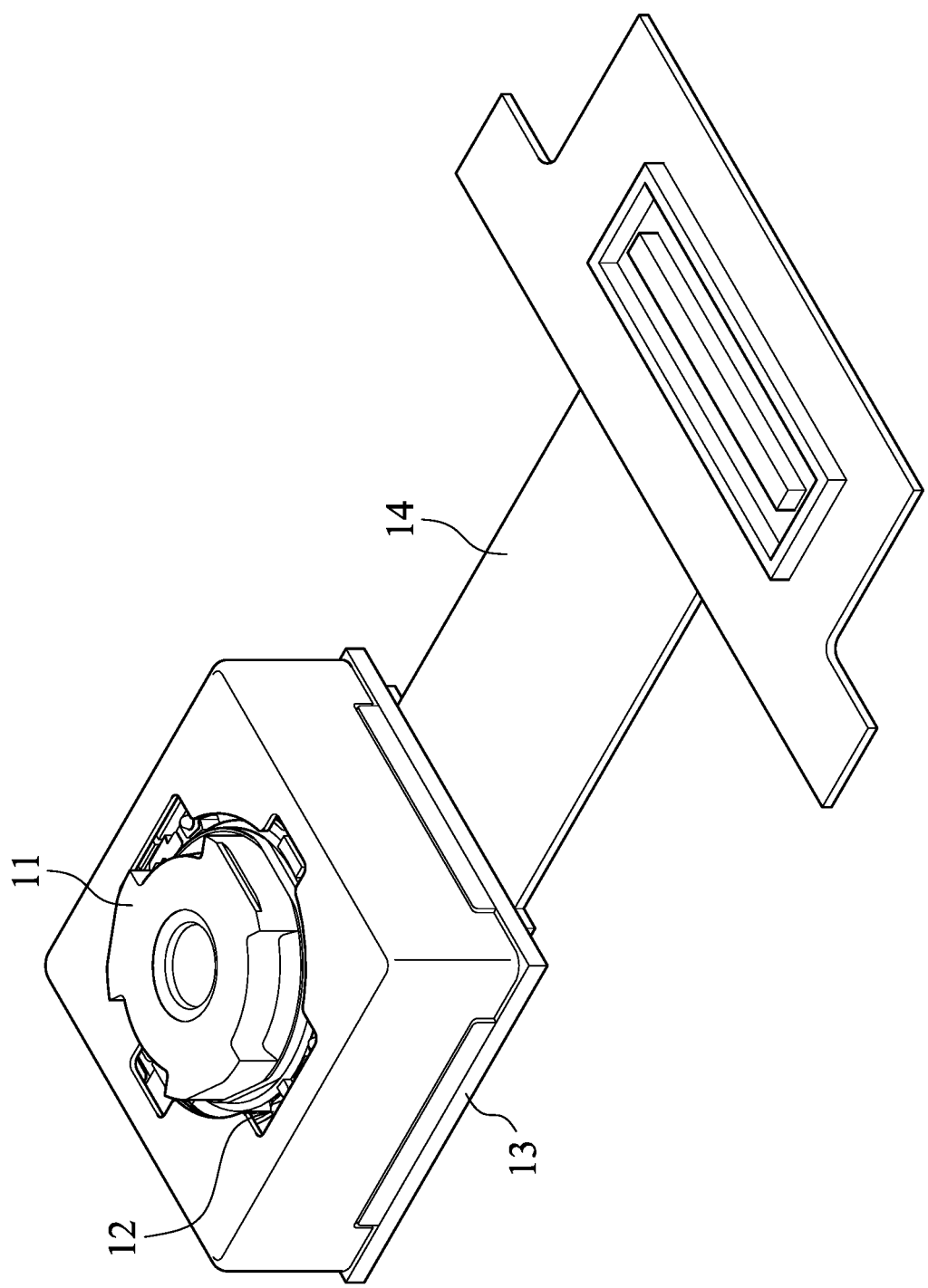
FIG. 18B is a three dimensional schematic view of the image capturing apparatus of FIG. 18A.

FIG. 18A is a system schematic view of an image capturing apparatus 10 according to the 9th embodiment of the present disclosure. FIG. 18B is a three dimensional schematic view of the image capturing apparatus 10 of FIG. 18A. In FIG. 18A and FIG. 18B, the image capturing apparatus 10 of the 9th embodiment is a camera module, the image capturing apparatus 10 includes an imaging lens assembly 11, a driving apparatus 12, an image sensor 13 and a conducting wire circuit 14, wherein the imaging lens assembly 11 includes the photographing optical lens system of the 1st embodiment and a lens barrel (not shown in drawings) for carrying the photographing optical lens system. The image capturing apparatus 10 can focus light from an imaged object 17 via the imaging lens assembly 11, perform image focusing by the driving apparatus 12, and generate an image on the image sensor 13, and the imaging information can be transmitted via the conducting wire circuit 14.

The driving apparatus 12 can be an auto-focus module, which can be driven by driving systems, such as voice coil motors (VCM), micro electro-mechanical systems (MEMS), piezoelectric systems, and shape memory alloys etc., accompanied by a focusing assisting module (not shown in drawings) with distance measuring means of laser or infrared beams. The photographing optical lens system can obtain a favorable imaging position by the driving apparatus 12 so as to capture clear images when the imaged object 17 is disposed at different object distances. Moreover, the image capturing apparatus 10 can further include an image stabilization module 15, which can be a kinetic energy sensor, such as an accelerometer, a gyroscope, and a hall effect sensor, so that the variation of different axial directions of the photographing optical lens system can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

The image capturing apparatus 10 can includes the image sensor 13 located on the image surface of the photographing optical lens system, such as CMOS and CCD, which has superior photosensitivity and low noise, thus it is favorable for providing realistic images with high definition image quality thereof. Furthermore, the image sensor 13 can be further connected to an image signal processor 13a (ISP) and an image software processor 13b so as to optimize the image quality.

Moreover, the image capturing apparatus 10 can further include a flash module 16, so that the image quality can be enhanced with sufficient illumination level during exposure.

10th Embodiment

Figure 19A:
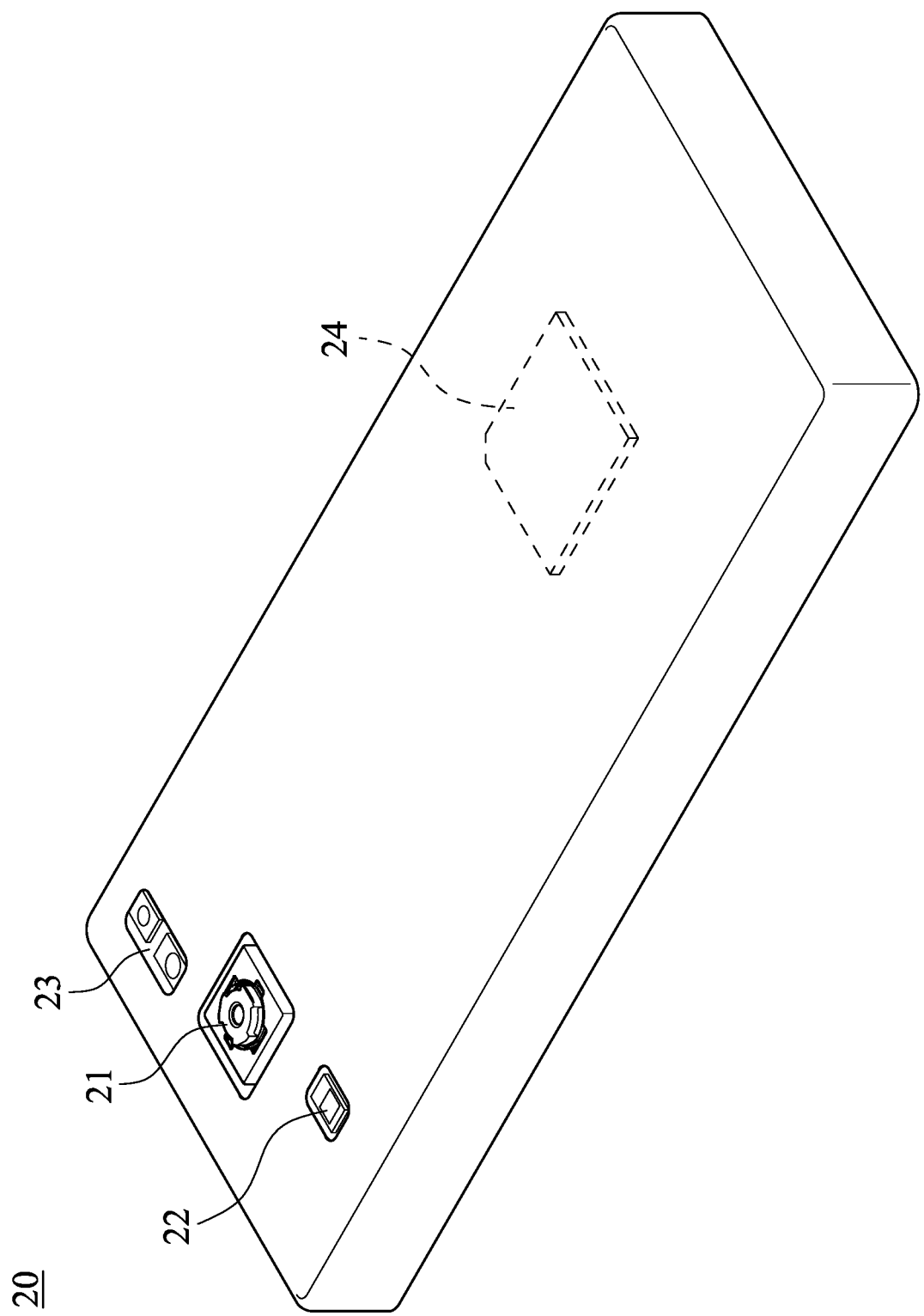
FIG. 19A is a schematic view of one side of an electronic device according to the 10th embodiment of the present disclosure.
Figure 19B:
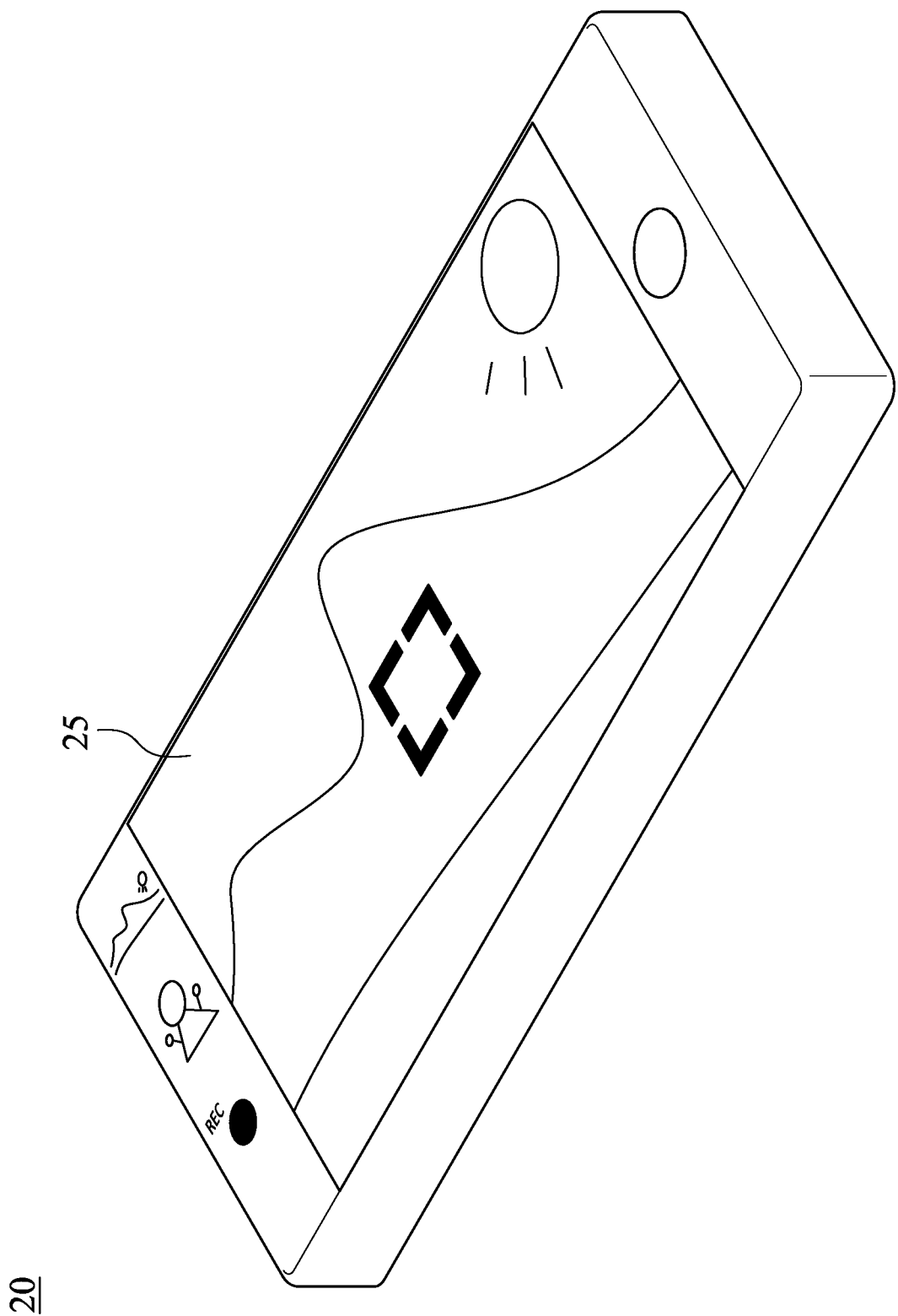
FIG. 19B is a schematic view of another side of the electronic device of FIG. 19A.

FIG. 19A is a schematic view of one side of an electronic device 20 according to the 10th embodiment of the present disclosure. FIG. 19B is a schematic view of another side of the electronic device 20 of FIG. 19A. In FIG. 19A and FIG. 19B, the electronic device 20 according to the 10th embodiment is a smartphone, the electronic device 20 includes an image capturing apparatus 21 and a user interface 25, wherein electronic device 20 of the 10th embodiment includes a flash module 22, a focusing assisting module 23, an image signal processor 24, which are the same to the corresponding elements of the 9th embodiment, and will not be stated herein again. When the user captures images via the user interface 25, the electronic device 20 focuses and generates an image via the image capturing apparatus 21. while compensating for low illumination via the flash module 22. Then, the electronic device 20 quickly focuses on the imaged object according to its object distance information provided by the focusing assisting module 23, and optimizes the image via the image signal processor 24. Thus, the image quality can be further enhanced. The focusing assisting module 23 can adopt infrared or laser for obtaining quick focusing, and the user interface 25 can utilize a touch screen or a physical button for capturing and processing the image with various functions of the image processing software.

11th Embodiment

Figure 20:
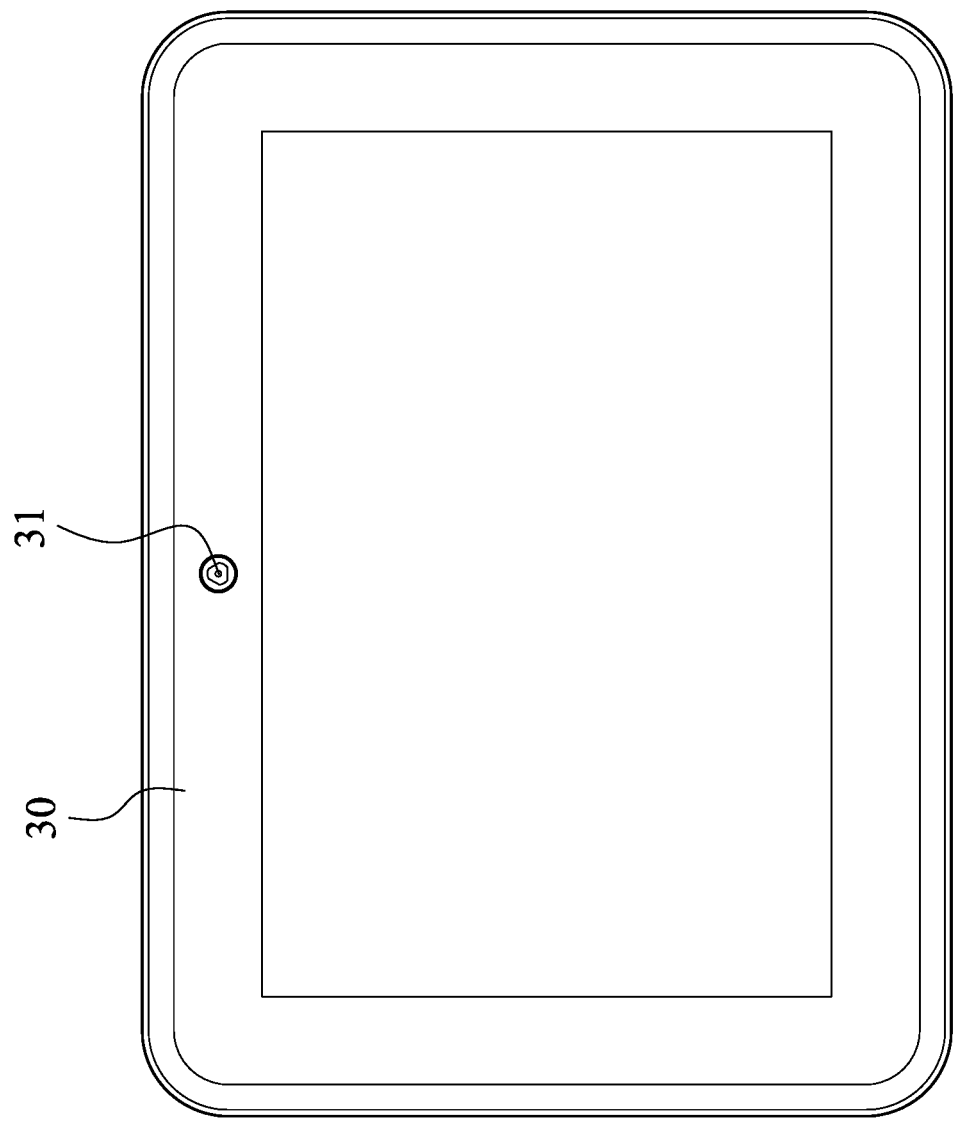
FIG. 20 is a schematic view of an electronic device according to the 11th embodiment of the present disclosure.

FIG. 20 is a schematic view of an electronic device 30 according to the 11th embodiment of the present disclosure. The electronic device 30 of the 11th embodiment is a tablet personal computer, wherein the electronic device 30 includes an image capturing apparatus 31. The image capturing apparatus 31 includes a photographing optical lens system (its reference numeral is omitted) according to the present disclosure and an image sensor (its reference numeral is omitted), wherein the image sensor is disposed on an image surface of the photographing optical lens system.

12th Embodiment

Figure 21:
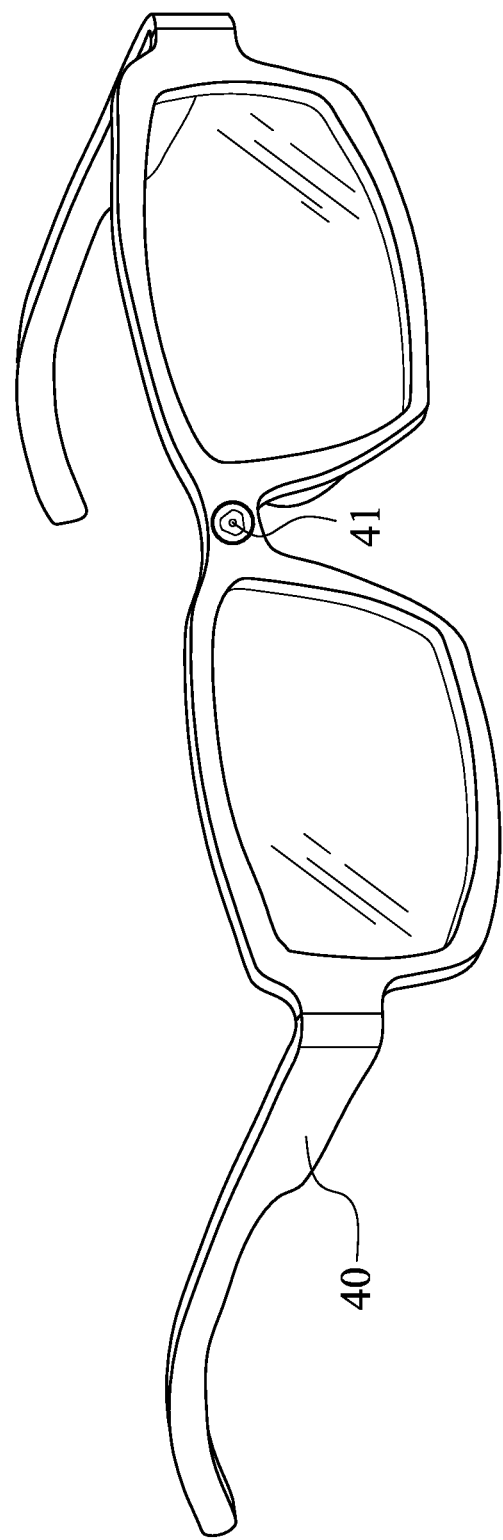
FIG. 21 is a schematic view of an electronic device according to the 12th embodiment of the present disclosure.

FIG. 21 is a schematic view of an electronic device 40 according to the 12th embodiment of the present disclosure. The electronic device 40 of the 12th embodiment is a wearable device, wherein the electronic device 40 includes an image capturing apparatus 41. The image capturing apparatus 41 includes a photographing optical lens system (its reference numeral is omitted) according to the present disclosure and an image sensor (its reference numeral is omitted), wherein the image sensor is disposed on an image surface of the photographing optical lens system.

The foregoing description, for purpose of explanation, has been described with reference to specific embodiments. It is to be noted that Tables 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising six lens elements, the six lens elements being, in order from an object side to an image side:
   a first lens element;
   a second lens element with positive refractive power having an image-side surface being convex in a paraxial region thereof;
   a third lens element with negative refractive power having an object-side surface being convex in a paraxial region thereof and an image-side surface being concave in a paraxial region thereof;
   a fourth lens element having an image-side surface being convex in a paraxial region thereof;
   a fifth lens element with positive refractive power having an image-side surface being convex in a paraxial region thereof; and
   a sixth lens element with negative refractive power having an image-side surface being concave in a paraxial region thereof, wherein the image-side surface of the sixth lens element comprises at least one convex critical point in an off-axial region thereof;
   wherein an Abbe number of the third lens element is V3, an Abbe number of the fourth lens element is V4, an Abbe number of the fifth lens element is V5, a sum of axial distances between every adjacent lens element of the photographing optical lens system is $\Sigma AT$, an axial distance between the third lens element and the fourth lens element is T34, and the following conditions are satisfied:
   $(V3+V4)/V5<1.0$; and
   $1.0<\Sigma AT/T34<2.0$.

2. The photographing optical lens system of claim 1, wherein the first lens element has an image-side surface being concave in a paraxial region thereof.

3. The photographing optical lens system of claim 1, wherein the sum of axial distances between every adjacent lens element of the photographing optical lens system is ΣAT, the axial distance between the third lens element and the fourth lens element is T34, and the following condition is satisfied:

1.50≤ΣAT/T34<2.0.

4. The photographing optical lens system of claim 1, wherein the sixth lens element has an object-side surface being convex in a paraxial region thereof.

5. The photographing optical lens system of claim 1, wherein the fifth lens element has an object-side surface being concave in a paraxial region thereof.

6. The photographing optical lens system of claim 1, wherein the fourth lens element has an object-side surface being concave in a paraxial region thereof.

7. The photographing optical lens system of claim 1, wherein a curvature radius of an object-side surface of the second lens element is R3, a curvature radius of the image-side surface of the second lens element is R4, and the following condition is satisfied:

−0.70<(R3+R4)/(R3−R4).

8. The photographing optical lens system of claim 1, wherein the Abbe number of the third lens element is V3, the Abbe number of the fourth lens element is V4, the Abbe number of the fifth lens element is V5, and the following condition is satisfied:

(V3+V4)/V5≤0.88.

9. The photographing optical lens system of claim 1, wherein an f-number of the photographing optical lens system is Fno, and the following condition is satisfied:

1.20<Fno<2.45.

10. The photographing optical lens system of claim 9, wherein the f-number of the photographing optical lens system is Fno, and the following condition is satisfied:

1.20<Fno≤1.95.

11. A photographing optical lens system comprising six lens elements, the six lens elements being, in order from an object side to an image side:
a first lens element;
a second lens element with positive refractive power having an image-side surface being convex in a paraxial region thereof;
a third lens element with negative refractive power having an object-side surface being convex in a paraxial region thereof and an image-side surface being concave in a paraxial region thereof;
a fourth lens element having an image-side surface being convex in a paraxial region thereof;
a fifth lens element with positive refractive power having an image-side surface being convex in a paraxial region thereof; and
a sixth lens element with negative refractive power having an image-side surface being concave in a paraxial region thereof, wherein the image-side surface of the sixth lens element comprises at least one convex critical point in an off-axial region thereof;
wherein an absolute value of a curvature radius of an image-side surface of the first lens element is greater than an absolute value of a curvature radius of the object-side surface of the third lens element, an Abbe number of the third lens element is V3, the Abbe number of the fourth lens element is V4, an Abbe number of the fifth lens element is V5, and the following condition is satisfied:

(V3+V4)/V5<1.0.

12. The photographing optical lens system of claim 11, wherein an axial distance between the third lens element and the fourth lens element is T34, an axial distance between the fifth lens element and the sixth lens element is T56, and the following condition is satisfied:

T56/T34<1.0.

13. The photographing optical lens system of claim 11, wherein the first lens element has an object-side surface being convex in a paraxial region thereof and comprising at least one concave critical point in an off-axial region thereof.

14. The photographing optical lens system of claim 11, wherein an f-number of the photographing optical lens system is Fno, and the following condition is satisfied:

1.20<Fno<2.45.

15. The photographing optical lens system of claim 11, wherein the sixth lens element has an object-side surface being convex in a paraxial region thereof.

16. The photographing optical lens system of claim 11, wherein the fifth lens element has an object-side surface being concave in a paraxial region thereof.

17. The photographing optical lens system of claim 11, wherein an axial distance between the third lens element and the fourth lens element is a maximum value of axial distances between every adjacent lens elements of the photographing optical lens system.

18. The photographing optical lens system of claim 11, wherein a curvature radius of an object-side surface of the second lens element is R3, a curvature radius of the image-side surface of the second lens element is R4, and the following condition is satisfied:

−0.70<(R3+R4)/(R3−R4).

19. A photographing optical lens system comprising six lens elements, the six lens elements being, in order from an object side to an image side:
a first lens element;
a second lens element with positive refractive power having an image-side surface being convex in a paraxial region thereof;
a third lens element with negative refractive power having an image-side surface being concave in a paraxial region thereof;
a fourth lens element having an image-side surface being convex in a paraxial region thereof;
a fifth lens element with positive refractive power having an image-side surface being convex in a paraxial region thereof; and
a sixth lens element with negative refractive power having an image-side surface being concave in a paraxial region thereof, wherein an object-side surface and the image-side surface of the sixth lens element are aspheric, and the image-side surface of the sixth lens element comprises at least one convex critical point in an off-axial region thereof;
wherein an absolute value of a curvature radius of an image-side surface of the first lens element is greater than an absolute value of a curvature radius of the object-side surface of the third lens element, an absolute value of a curvature radius of the image-side surface of the second lens element is greater than an absolute value of a curvature radius of the image-side surface of the third lens element, an Abbe number of the third lens element is V3, an Abbe number of the fourth lens element is V4, an Abbe number of the fifth lens element is V5, and the following condition is satisfied:

(V3+V4)/V5<1.0.

20. The photographing optical lens system of claim 19, wherein the Abbe number of the third lens element is V3, the Abbe number of the fourth lens element is V4, the Abbe number of the fifth lens element is V5, and the following condition is satisfied:

(V3+V4)/V5≤0.88.

21. The photographing optical lens system of claim 19, wherein a focal length of the photographing optical lens system is f, a vertical distance between a maximum effective radius position on the image-side surface of the sixth lens element and an optical axis is SD62, and the following condition is satisfied:

0.80<f/SD62<1.30.

22. The photographing optical lens system of claim 19, wherein a focal length of the photographing optical lens system is f, a curvature radius of the object-side surface of the sixth lens element is R11, and the following condition is satisfied:

f/R11<0.60.

23. The photographing optical lens system of claim 19, wherein an axial distance between the third lens element and the fourth lens element is a maximum value of axial distances between every adjacent lens elements of the photographing optical lens system.

24. The photographing optical lens system of claim 19, wherein an f-number of the photographing optical lens system is Fno, and the following condition is satisfied:

1.20<Fno≤2.08.

* * * * *